(12) United States Patent
Abdelhamid et al.

(10) Patent No.: US 12,391,800 B1
(45) Date of Patent: Aug. 19, 2025

(54) TETRAPHENYLETHENE-BASED POLYMERS FOR SUPERCAPACITORS

(71) Applicant: IMAM MOHAMMAD IBN SAUD ISLAMIC UNIVERSITY, Riyadh (SA)

(72) Inventors: Hani Nasser Abdelhamid, Riyadh (SA); Abdelreheem Abdelfatah Saddik, Assiut (EG)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/082,783

(22) Filed: Mar. 18, 2025

(51) Int. Cl.
  *C08G 73/02* (2006.01)
  *H01G 11/54* (2013.01)
  *H01G 11/84* (2013.01)

(52) U.S. Cl.
  CPC ......... *C08G 73/0206* (2013.01); *H01G 11/54* (2013.01); *H01G 11/84* (2013.01)

(58) Field of Classification Search
None
See application file for complete search history.

(56) References Cited

U.S. PATENT DOCUMENTS 9,622,991 B2 * 4/2017 Zhi ................. A61K 31/423
2016/0336619 A1 * 11/2016 Choi ................. H01M 10/052
(Continued)

FOREIGN PATENT DOCUMENTS

CN 106898492 B 7/2018
CN 106632933 B 10/2018
(Continued)

OTHER PUBLICATIONS

Mohamed Gamal Mohamed, et al., "Meso/Microporous Carbons from Conjugated Hyper-Crosslinked Polymers Based on Tetraphenylethene for High-Performance CO2 Capture and Supercapacitor", Molecules 2021, vol. 26, 738, Jan. 31, 2021, 16 pages.
(Continued)

*Primary Examiner* — Dion R. Ferguson
(74) *Attorney, Agent, or Firm* — Oblon, McClelland, Maier & Neustadt, L.L.P.

(57) ABSTRACT

A polymer that includes repeating units having a structure which is at least one selected from the group including of formula (1) and formula (2). Further, a method of forming the polymer is described. The polymer is used in a supercapacitor, which includes first and second electrodes and an electrolyte which includes the polymer.

(Continued)

(1)

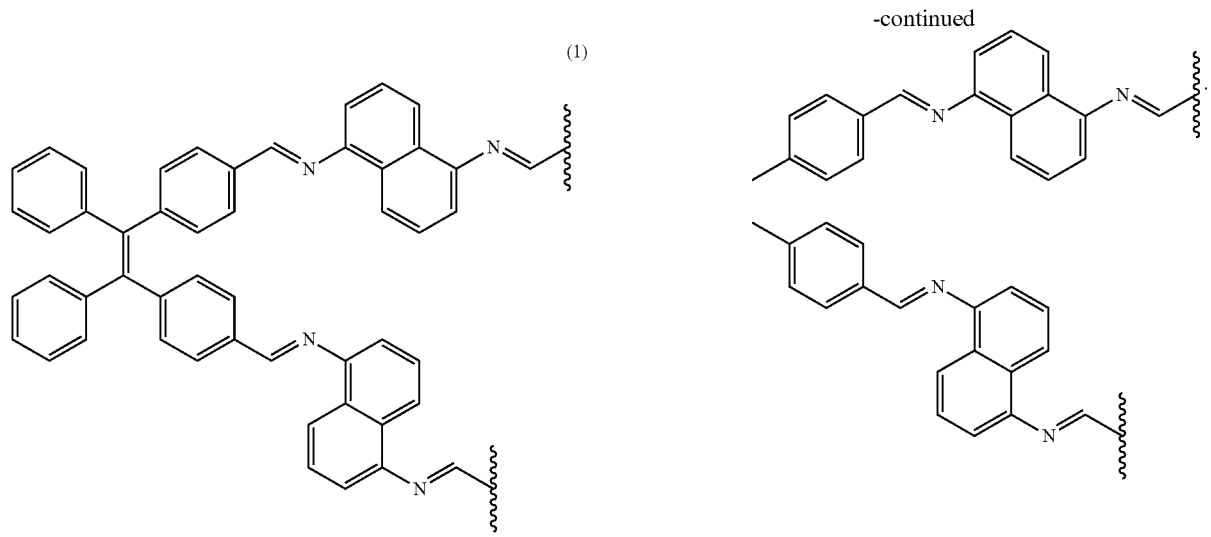

(2)

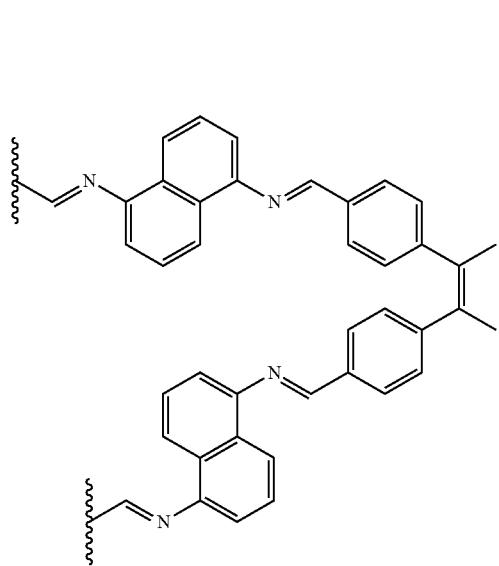

20 Claims, 16 Drawing Sheets

(56) References Cited

U.S. PATENT DOCUMENTS

2017/0077549 A1* 3/2017 Park .................. H01M 4/366
2022/0334443 A1* 10/2022 Mei .................... G02F 1/137

FOREIGN PATENT DOCUMENTS

| CN | 107200832 B | | 5/2019 | |
|---|---|---|---|---|
| JP | 2004501244 A | * | 1/2004 | ............ C08F 212/32 |
| KR | 20160140211 A | * | 12/2016 | .......... H01M 10/052 |
| WO | WO-2020198464 A1 | * | 10/2020 | ............. C07B 31/00 |

OTHER PUBLICATIONS

Aya Osama Mousa, et al., "Bifunctional imidazolium linked tetraphenylethene based conjugated microporous polymers for dynamic antibacterial properties and supercapacitor electrodes", Polymer Chemistry 2024, vol. 15. No. 5, pp. 397-411, 6 pages.

Abdelreheem Abdelfatah Saddik, et al., "Conjugated tetraphenylethene-based polymers for supercapacitor", vol. 315, Dec. 17, 2024, 127778, 8 pages.

* cited by examiner

TETRAPHENYLETHENE-BASED POLYMERS FOR SUPERCAPACITORS

STATEMENT OF PRIOR DISCLOSURE BY AN INVENTOR

Aspects of the present disclosure are described in Abdelreheem Abdelfatah Saddik and Hani Nasser Abdelhamid, "Conjugated tetraphenylethene-based polymers for supercapacitor", Polymer, 2024, 315, 127778, which is incorporated herein by reference in its entirety.

BACKGROUND

Technical Field

The present disclosure is directed towards a polymer that includes a tetraphenylethene derivative which may be useful as an electrode material in supercapacitors for efficient energy storage.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Rising global energy demand has increased reliance on fossil fuels, but their continued use has led to resource depletion and severe environmental challenges, including climate change. Thus, it is imperative to reduce fossil fuel consumption and move to carbon-neutral energy technologies [Gao, Z., International Journal of Extreme Manufacturing, 2024, 6, 5, 052002]. The sun delivers immense amounts of energy, but efficient harvesting and storage remain a challenge. In recent years, the demand for electrical energy storage has grown sharply across a variety of fields, such as mobile devices, transportation, and backup power systems, requiring effective solutions. However, existing electrochemical storage systems remain costly, have high weight, low coulombic efficiency, relatively short lifespan, slow charging, or combinations of these. This restricts large-scale adoption and emphasizes the need for improvement. Electrochemical supercapacitors have emerged as a promising solution for large-scale energy storage, offering significant advantages over lithium-ion batteries due to their high-power density, fast charge-discharge rate, high coulombic efficiency, and long cycle life.

The integration of renewable energy sources represents modern civilization but depends on time and weather. Thus, advancing energy storage technology is essential to ensure continuous access to energy independent of time or energy source availability [Abdelhamid, H. N., Magnetic-based nanocomposites for hydrogen generation as renewable energy, In *Magnetic Nanoparticles and Polymer Nanocomposites*, Woodhead Publishing, 2024, 499-516]. Among several energy storage systems, supercapacitors and batteries, which store energy electrochemically are highly preferred due to their efficient storage capacity and since the processes are environmentally friendly [Abdelhamid, H. N., "Three-dimensional (3D) printed supercapacitor, In *Handbook of Energy Materials*, Springer Nature Singapore, 2023, 1-21]. Unlike conventional batteries, which rely on chemical reactions, supercapacitors store energy through electrostatic charge accumulation, enabling rapid charging and discharging while maintaining high power output. The extended cycle life and efficiency make supercapacitors ideal for applications demanding frequent energy bursts. However, a primary limitation is lower energy density compared to batteries, restricting their ability to sustain long-duration energy storage. To further enhance supercapacitor performance, research has focused on developing advanced electrode materials, with conducting polymers developing as a favorable class due to their high capacitance, tunable electrical properties, flexibility, and cost-effectiveness.

Conducting polymers such as polyaniline (PANI), polypyrrole (PPy), and poly(3,4-ethylenedioxythiophene) (PEDOT) have gained significant attention for their high capacitance, good electrical conductivity, and convenient synthesis. These materials facilitate efficient charge storage through reversible redox reactions, improving the overall performance of supercapacitors. Additionally, polymer-based composites with carbon nanomaterials or metal oxides further enhance conductivity and stability. However, conducting polymers face challenges such as poor cycle stability, structural degradation over repeated charge-discharge cycles, and limited mechanical strength, which can impact long-term performance. Addressing these drawbacks through polymer modifications and hybrid materials remains a key research focus for advancing supercapacitor technology.

Organic polymers, including covalent-organic frameworks (COFs) and conjugated microporous polymers (CMPs), serve as electro-active materials for supercapacitors [Abdelhamid, H. N., Covalent Organic Frameworks-based Nanomaterials as Electrode Materials for Supercapacitors, In *Covalent Organic Frameworks*, CRC Press, 2022,465-484; & Mohamed, M. G., et. al., ACS Applied Energy Materials, 2022, 5, 8, 10130-10140]. Organic polymers may be synthesized through coupling and condensation reactions, these materials exhibit high surface area, porosity, thermal stability, and strong optoelectronic properties. Conjugated polymers enable charge storage via electrostatic and faradaic processes, enhancing energy storage efficiency. However, many of these materials face challenges such as low capacitance and poor cycle stability. For example, polystyrene sulfonate (PEDOT) and poly(pyrrole), which are conjugated polymers, have been investigated for use in supercapacitors. These materials exhibited good conductivity and stability but suffered from with low energy density and reduced cycle life, specifically under high charge/discharge rates. PEDOT-based materials exhibit enhanced cycle life but limited energy storage capacity, while poly (thiophene)-based polymers and doped conjugated polymers face stability and performance challenges.

The functional groups in organic polymers may be tuned to offer high electroactivity. Mousa and colleagues created a mesoporous organic polymer called TPET-Im, which was formed from 1,1,2,2-tetrakis(4-ethynylphenyl)ethene (TPET), 1,3,6,8-tetraethynylpyrene (PT), and imidazolium (Im) [Mousa, A. O., et. al., Polymer Chemistry, 2024, 15, 5, 397-411]. TPET-Im showed specific capacitance and energy density of 63 farads per gram (F/g) and 8.73 watt-hours per kilogram (Wh/Kg), respectively. Similarly, Mohamed and colleagues reported tetraphenylethene (TPE)-based CMPs, namely TPE-Ph-BSu CMP [Mohamed, M. G., et. al., Colloids and Surfaces A: Physicochemical and Engineering Aspects, 2024, 680, 132675]. These CMPs demonstrated acceptable thermal capabilities with a thermal decomposition temperature of 535° C. and a char yield of 73 wt. %. Further, the TPE-Ph-BSu CMP exhibited good supercapacitive performance in the electrochemical tests, with a specific capacity of 52 F/g (@0.5 A/g). However, the electrochemical performance of most of the reported polymers is low and requires improvement for practical development.

1,5-Diaminonaphthalene (1,5-DAN) can form poly(1,5-diaminonaphthalene) (1,5-PDAN), a potential aqueous supercapacitor electrode material with a theoretical capacitance of 1545 F/g [Acerce, M., et. al., ACS Applied Materials & Interfaces, 2021, 13, 45, 53736-53745; & Pham, M. C., et. al., Synthetic Metals, 1998, 93, 2, 89-96]. The electrochemical performance was attributed to the presence of imine and amine functional groups. Acerce reported a process that involved loading redox materials onto carbon nanotube (CNT)/carbon cloth (CC), forming CNT-a-CC. This 3D structure, with interconnected cylindrical tubes, facilitated ion and electron movement. Furthermore, PDAN stores more charge than polyaniline and polypyrrole, making it a potential for high-performance supercapacitors [Lai et al., Journal of Energy Storage, 2024, 91, 112032]. The loading of a thin layer from 1,5-PDAN on CNT-a-CC increases the gravimetric capacitance of 1,5-PDAN which can reach up to 900 F/g and 1250 F/g at 100 millivolt per second (mV/s). 1,5-diaminonaphthalene was electropolymerized on CC.

Polymeric supercapacitors have made progress, but challenges remain in developing efficient electrodes. Addressing drawbacks and improving performance and durability are crucial for effective energy storage.

Accordingly, one object of the present disclosure is to provide a polymer and a method of synthesis thereof for use in supercapacitors, that may circumvent the drawbacks and limitations, such as low energy density, limited stability, poor conductivity, insufficient charge transfer, and limited light absorption, of the methods and materials already known in the art.

SUMMARY

According to a first aspect, the present disclosure relates to a polymer having repeating units having a structure which is at least one selected from the group including of formula (1) and formula (2),

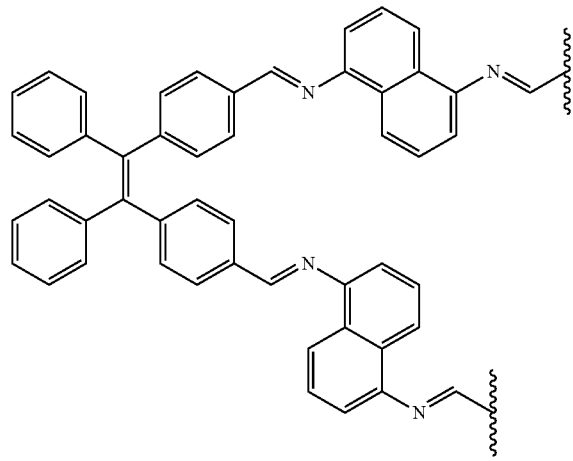

(1)

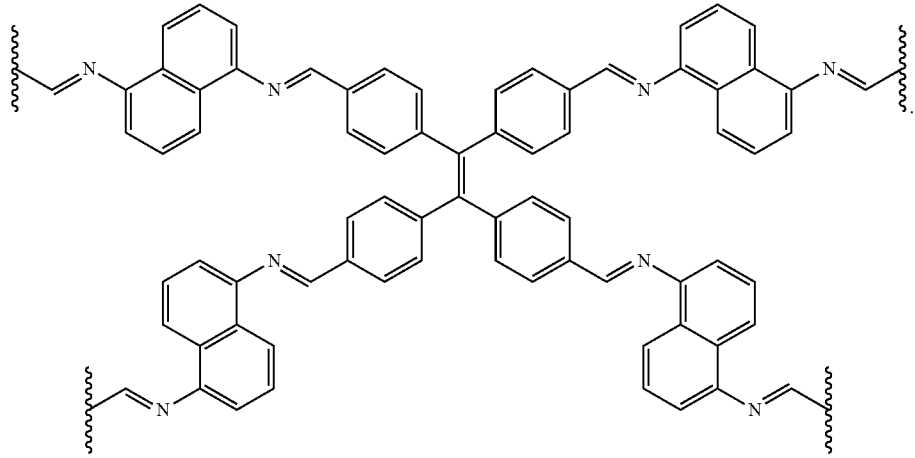

(2)

In some embodiments, the polymer has a band gap of 1.9 electron volt (eV) to 2.9 eV.

In some embodiments, the polymer has a capacitance of 175 farads pe gram (F/g) to 300 F/g.

In some embodiments, the polymer is in the form of spherical particles having a mean particle size of 0.1 micrometer (μm) to 15 μm.

In some embodiments, the polymer has repeating units having a structure of formula (1) and is substantially free of repeating units having a structure of formula (2).

In some embodiments, the polymer has repeating units having a structure of formula (2) and is substantially free of repeating units having a structure of formula (1).

In some embodiments, the polymer has 500 to 500,000 repeating units having a structure which is at least one selected from the group including of formula (1) and formula (2).

In some embodiments, the polymer has a structure consisting of repeating units which is at least one selected from the group including of formula (1) and formula (2).

The present disclosure also relates to a supercapacitor. In some embodiments, the supercapacitor includes a pair of electrodes including a first electrode and a second electrode separated by an electrolyte including the aforementioned polymer.

In some embodiments, the first electrode and the second electrode are each formed of nickel (Ni) foam.

In some embodiments, the electrolyte further includes carbon black and polyvinylidene difluoride (PVDF).

In some embodiments, the electrolyte includes 60 weight percent (wt. %) to 80 wt. % the polymer, 15 wt. % to 25 wt. % carbon black, and 5 wt. % to 15 wt. % polyvinylidene difluorides, each based on a total weight of electrolyte.

In some embodiments, the supercapacitor has a specific capacity of 75 milliampere-hours per gram mass (mAh/g) to 125 mAh/g.

In some embodiments, which retains at least 90% of an initial capacitance after 5000 charge-discharge cycles.

The present disclosure also relates to a method of forming the polymer. In some embodiments, the polymer has repeating units having a structure of formula (1) and is substantially free of repeating units having a structure of formula (2). In some embodiments, the method including reacting a dialdehyde of formula (3) with 1,5-diaminonaphthalene in a mixture including an alcohol having 1 carbon atom to 5 carbon atoms, a halogenated organic solvent, and an organic acid having 1 carbon atom to 5 carbon atoms to produce the polymer having repeating units having a structure of formula (1),

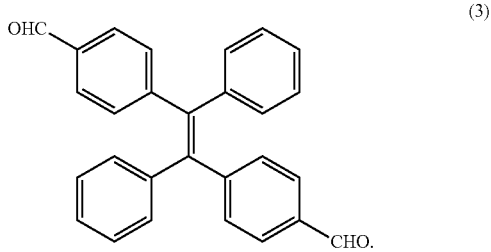

(3)

The present disclosure also relates to a method of forming the supercapacitor. In some embodiments, the method involves dispersing the polymer in a deposition solvent to form an electrolyte deposition slurry, disposing the electrolyte comprising the polymer on the first electrode such that the electrolyte forms a uniform film covering an entirety of a top surface of the first electrode, and placing onto the electrolyte the second electrode such that the second electrode is separated from the first electrode by the electrolyte to form the supercapacitor.

In some embodiments, the alcohol having 1 carbon atom to 5 carbon atoms is n-butanol. The halogenated organic solvent is 1,2-dichlorobenzene, and the organic acid having 1 carbon atom to 5 carbon atoms is acetic acid. In some embodiments, the electrolyte deposition solvent is N-methyl pyrrolidone In some embodiments, the reacting is performed at 100° C. to 150° C.

The present disclosure also relates to a method of forming the polymer. In some embodiments, the polymer has repeating units having a structure of formula (2) and is substantially free of repeating units having a structure of formula (1). In some embodiments, the method includes reacting a tetraaldehyde of formula (4) with 1,5-diaminonaphthalene in a mixture including an alcohol having 1 carbon atom to 5 carbon atoms, a halogenated organic solvent, and an organic acid having 1 carbon atom to 5 carbon atoms to produce the polymer having repeating units having a structure of formula (2),

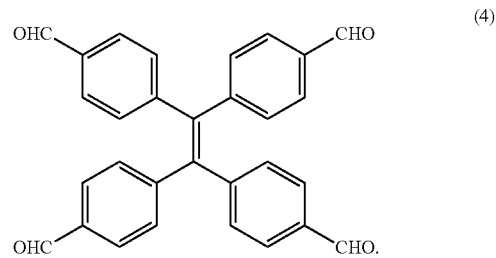

(4)

The present disclosure also relates to a method of forming the supercapacitor. In some embodiments, the method involves dispersing the polymer in a deposition solvent to form an electrolyte deposition slurry, disposing the electrolyte comprising the polymer on the first electrode such that the electrolyte forms a uniform film covering an entirety of a top surface of the first electrode, and placing onto the electrolyte the second electrode such that the second electrode is separated from the first electrode by the electrolyte to form the supercapacitor.

In some embodiments, the alcohol having 1 carbon atom to 5 carbon atoms is n-butanol. In some embodiments, the halogenated organic solvent is 1,2-dichlorobenzene. In some embodiments, the organic acid having 1 to 5 carbon atoms is acetic acid. In some embodiments, the electrolyte deposition solvent is N-methyl pyrrolidone In some embodiments, the reacting is performed at 100° C. to 150° C.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
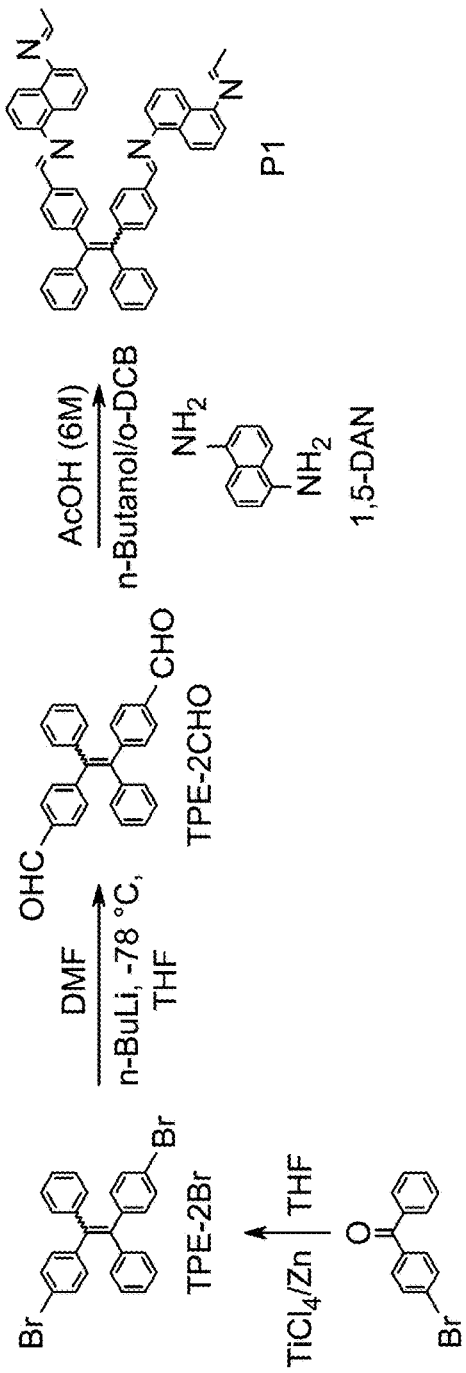
FIG. 1A illustrates a schematic synthesis of polymer P1 from tetraphenylethene-2-aldehyde (TPE-2CHO), tetraphenylethene-4-aldehyde (TPE-4CHO), and 1,5-diaminonaphthalene (1,5-DAN) monomers, according to certain embodiments.

When describing the present disclosure, the terms used are to be construed in accordance with the following definitions, unless a context dictates otherwise In the drawings, like reference numerals designate identical or corresponding parts throughout the several views.

Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term "polymer" refers to a large molecule composed of repeating structural units, typically derived from monomers, which are covalently bonded in a chain-like structure and may exhibit unique physical and chemical properties depending on their composition and architecture.

As used herein, the term "supercapacitor" refers to an electrochemical energy storage device that stores energy through the electrostatic accumulation of charge on the surface of electrodes, offering high power density, rapid charge and discharge rates, and excellent cycling stability compared to traditional capacitors and batteries.

As used herein, the term "band gap" refers to the energy difference between the highest occupied electron energy level (valence band) and the lowest unoccupied electron energy level (conduction band) in a material, which determines its electrical conductivity and optical properties, such as its ability to absorb or emit light.

As used herein, the term "capacitance" refers to the ability of a system or component, such as a capacitor or supercapacitor, to store electrical charge per unit of voltage, typically measured in farads (F), and is a parameter in useful in describing a charge or energy storage capacity of the device.

As used herein, the term "mean particle size" refers to the average size of particles in a given sample, typically measured in micrometers (μm) or nanometers (nm), and is calculated based on the distribution of particle sizes within the sample.

As used herein, the term "repeating unit" refers to the smallest structural unit or monomeric unit within a polymer chain that is repeated multiple times to form the overall polymer, maintaining the polymer's chemical structure and properties throughout the length of the chain.

As used herein, the term "electrode" refers to a conductive material or component through which electrical current enters or exits an electrochemical cell, such as in batteries, capacitors, or supercapacitors, facilitating charge transfer during charge and discharge processes.

As used herein, the term "electrolyte" refers to a conductive medium, typically a liquid, gel, or solid, that facilitates the movement of ions between the electrodes in an electrochemical cell, enabling charge transfer and maintaining electrical balance during the charge and discharge cycles.

As used herein, the term "specific capacity" refers to the amount of electric charge a material can store per unit mass, typically measured in milliampere-hours per gram (mAh/g), and is an important parameter for evaluating the energy storage performance of materials in devices such as batteries and supercapacitors.

According to a first aspect, the present disclosure is related to conjugated polymers based on substituted tetraphenylethene for use in supercapacitors. The polymers may be useful for offering high specific capacitance, excellent cycling stability, improved charge transfer properties, and enhanced light absorption capabilities, which are beneficial for hybrid energy systems.

The present disclosure relates to a polymer. In some embodiments, the polymer includes repeating units having a structure which is at least one of formula (1) and formula (2):

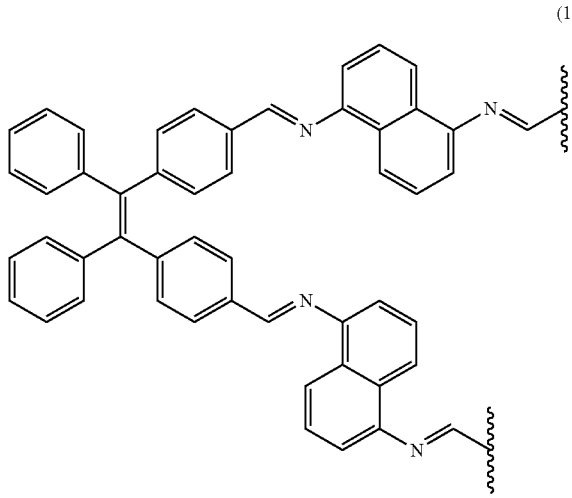

(1)

In some embodiments, the polymer may have a band gap ranging from 1.9 to 2.9 eV. For example, the polymer may have a band gap of 1.90 eV, 1.925 eV, 1.95 eV, 1.975 eV, 2.0 eV, 2.025 eV, 2.05 eV, 2.075 eV, 2.10 eV, 2.125 eV, 2.15 eV, 2.175 eV, 2.20 eV, 2.225 eV, 2.25 eV, 2.275 eV, 2.30 eV, 2.325 eV, 2.35 eV, 2.375 eV, 2.40 eV, 2.425 eV, 2.45 eV, 2.475 eV, 2.50 eV, 2.525 eV, 2.55 eV, 2.575 eV, 2.60 eV, 2.625 eV, 2.65 eV, 2.675 eV, 2.70 eV, 2.725 eV, 2.75 eV, 2.775 eV, 2.80 eV, 2.825 eV, 2.85 eV, 2.875 eV, or 2.90 eV.

In some embodiments, the polymer may have a capacitance ranging from 175 to 300 F/g. For example, the polymer may have a capacitance of 175 F/g, 180 F/g, 185 F/g, 190 F/g, 195 F/g, 200 F/g, 205 F/g, 210 F/g, 215 F/g, 220 F/g, 225 F/g, 230 F/g, 235 F/g, 240 F/g, 245 F/g, 250 F/g, 255 F/g, 260 F/g, 265 F/g, 270 F/g, 275 F/g, 280 F/g, 285 F/g, 290 F/g, 295 F/g, or 300 F/g.

In some embodiments, the polymer is present in the form of particles. In general, the polymer particles can be any shape known to one of ordinary skill in the art. Examples of suitable shapes the polymer particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), belts (also known as nanobelts), ribbons (also known as nanoribbons), and mixtures thereof. In the case of nanorods, the rod shape may be defined by a ratio of a rod length to a rod width, the ratio being known as the aspect ratio. For polymer particles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the polymer particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of polymer particles having a different shape. As used herein, the term "non-uniform shape" refers to an average

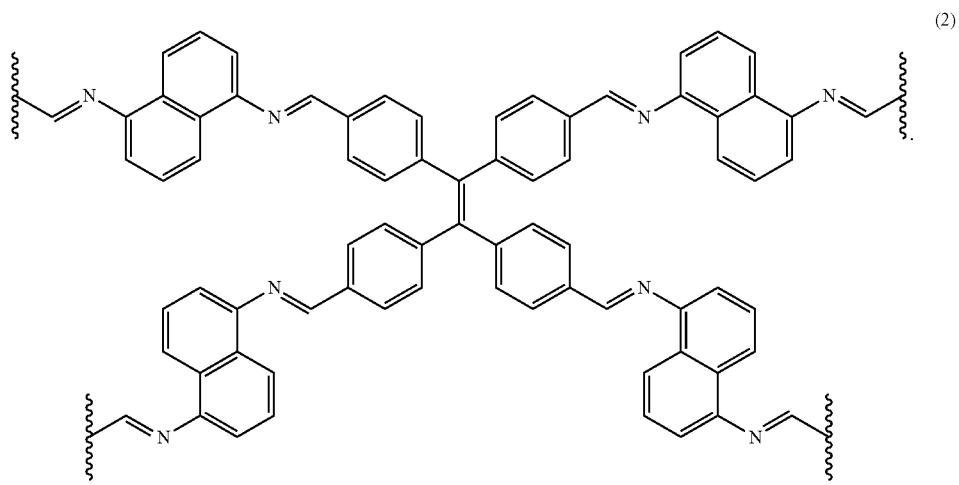 [SMILES: */C=N/c1cccc2c(/N=C/c3ccc(C(=C(c4ccc(/C=N/c5cccc6c(/N=C/*)cccc56)cc4)c4ccc(/C=N/c5cccc6c(/N=C/*)cccc56)cc4)c4ccc(/C=N/c5cccc6c(/N=C/*)cccc56)cc4)cc3)cccc12]

(2)

consistent shape that differs by more than 10% of the distribution of polymer particles having a different shape. In one embodiment, the shape is uniform and at least 90% of the polymer particles are spherical or substantially circular, and less than 10% are polygonal. In another embodiment, the shape is non-uniform and less than 90% of the polymer particles are spherical or substantially circular, and greater than 10% are polygonal.

In some embodiments, the polymer particles have a mean particle size of 0.1 to 15 µm. For example, the polymer particles may have a mean particle size of 0.1 µm, 0.25 µm, 0.5 µm, 0.75 µm, 1.0 µm, 1.25 µm, 1.5 µm, 1.75 µm, 2.0 µm, 2.25 µm, 2.5 µm, 2.75 µm, 3.0 µm, 3.25 µm, 3.5 µm, 3.75 µm, 4.0 µm, 4.25 µm, 4.5 µm, 4.75 µm, 5.0 µm, 5.25 µm, 5.5 µm, 5.75 µm, 6.0 µm, 6.25 µm, 6.5 µm, 6.75 µm, 7.0 µm, 7.25 µm, 7.5 µm, 7.75 µm, 8.0 µm, 8.25 µm, 8.5 µm, 8.75 µm, 9.0 µm, 9.25 µm, 9.5 µm, 9.75 µm, 10.0 µm, 10.25 µm, 10.5 µm, 10.75 µm, 11.0 µm, 11.25 µm, 11.5 µm, 11.75 µm, 12.0 µm, 12.25 µm, 12.5 µm, 12.75 µm, 13.0 µm, 13.25 µm, 13.5 µm, 13.75 µm, 14.0 µm, 14.25 µm, 14.5 µm, 14.75 µm, or 15 µm. In embodiments where the polymer particles are spherical, the particle size may refer to a particle diameter. In embodiments where the polymer particles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the polymer particles have an anisotropic shape such as nanorods, the particle size may refer to a length of the nanorod, a width of the nanorod, or an average of the length and width of the nanorod. In some embodiments in which the polymer particles have non-spherical shapes, the particle size refers to the diameter of a sphere having an equivalent volume as the particle. In some embodiments in which the polymer particles have non-spherical shapes, the particle size refers to the diameter of a sphere having an equivalent diffusion coefficient as the particle. In some embodiments, the polymer particles are spherical and have a mean particle size of 6.8 µm.

In some embodiments, the polymer particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the polymer particles of the present disclosure are monodisperse having a particle size distribution ranging from 80% of the average particle size to 120% of the average particle size, preferably 90-110%, preferably 95-105% of the average particle size. In some embodiments, the polymer particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the polymer may have repeating units having a structure of formula (1) and is substantially free of repeating units having a structure of formula (2). In some embodiments, the polymer may have repeating units having a structure of formula (2) and is substantially free of repeating units having a structure of formula (1).

In some embodiments, the polymer may have 500 to 500,000, repeating units having a structure which is at least one of formula (1) and formula (2). For example, the polymer may have 500, 550, 600, 650, 700, 750, 800, 850, 900, 950, 1000, 1250, 1500, 1750, 2000, 2250, 2500, 2750, 3000, 3250, 3500, 3750, 4000, 4250, 4500, 4750, 5000, 5250, 5500, 5750, 6000, 6250, 6500, 6750, 7000, 7250, 7500, 7750, 8000, 8250, 8500, 8750, 9000, 9250, 9500, 9750, 10,000, 11,000, 12,000, 13,000, 14,000, 15,000, 16,000, 17,000, 18,000, 19,000, 20,000, 22,500, 25,000, 27,500, 30,000, 32,500, 35,000, 37,500, 40,000, 42,500, 45,000, 47,500, 50,000, 55,000, 60,000, 65,000, 70,000, 75,000, 80,000, 85,000, 90,000, 95,000, 100,000, 125,000, 150,000, 175,000, 200,000, 225,000, 250,000, 275,000, 300,000, 325,000, 350,000, 375,000, 400,000, 425,000, 450,000, 475,000, or 500,000 such repeating units.

The present disclosure also relates to a supercapacitor. In some embodiments, the supercapacitor includes a pair of electrodes including a first electrode and a second electrode separated by an electrolyte including the polymer In general, the first electrode and second electrode can each be formed of any suitable electrode material known to one of ordinary skill in the art. Examples of suitable electrode materials include, but are not limited to copper foam, stainless steel mesh, graphene, carbon cloth, carbon paper, carbon felt, carbon nanotubes, graphite, activated carbon, titanium mesh, titanium foam, titanium foil, aluminum foil, aluminum mesh, silver nanowire mesh, gold foil, platinum mesh, molybdenum foil, zinc foam, lead dioxide-coated substrate, conductive polymer-coated carbon, boron-doped diamond, tin oxide-coated glass, indium tin oxide, fluorine-doped tin oxide, iron foam, cobalt foam, copper-nickel alloy mesh, vanadium-coated substrate, and conductive ceramic composites. In some embodiments, the first electrode is formed of nickel foam. In some embodiments, the second electrode is formed of nickel foam. In some embodiments, both the first electrode and second electrode are each formed of nickel foam.

In some embodiments, the electrolyte includes 50 to 98 wt. % the polymer, based on a total weight of electrolyte. For example, the electrolyte can include 50 wt. %, 52.5 wt. %, 55 wt. %, 57.5 wt. %, 60 wt. %, 62.5 wt. %, 65 wt. %, 67.5 wt. %, 70 wt. %, 72.5 wt. %, 75 wt. %, 77.5 wt. %, 80 wt. %, 82.5 wt. %, 85 wt. %, 87.5 wt. %, 90 wt. %, 92.5 wt. %, 95 wt. %, 97.5 wt. %, or 98 wt. % the polymer, based on a total weight of electrolyte. In some embodiments, the electrolyte includes 70 wt. % the polymer, based on a total weight of the electrolyte In some embodiment, the electrolyte includes 1 to 49 wt. %, carbon black, based on a total weight of electrolyte. For example, the electrolyte can include 1 wt. %, 2.5 wt. %, 5 wt. %, 7.5 wt. %, 10 wt. %, 12.5 wt. %, 15 wt. %, 17.5 wt. %, 20 wt. %, 22.5 wt. %, 25 wt. %, 27.5 wt. %, 30 wt. %, 32.5 wt. %, 35 wt. %, 37.5 wt. %, 40 wt. %, 42.5 wt. %, 45 wt. %, 47.5 wt. %, or 49 wt. % carbon black, based on a total weight of the electrolyte. In some embodiments, the electrolyte includes 20 wt. % carbon black, based on a total weight of the electrolyte.

In some embodiment, the electrolyte includes 1 to 25 wt. % polyvinylidene difluoride, based on a total weight of electrolyte. For example, the electrolyte can include 1 wt. %, 2.5 wt. %, 5 wt. %, 7.5 wt. %, 10 wt. %, 12.5 wt. %, 15 wt. %, 17.5 wt. %, 20 wt. %, 22.5 wt. %, or 25 wt. % polyvinylidene difluoride, based on a total weight of electrolyte. In some embodiments, the electrolyte includes 10 wt. % polyvinylidene difluoride, based on a total weight of electrolyte.

In some embodiments, the electrolyte may also include an ionic substance. Examples of suitable ionic substances which can be used include, but are not limited to, potassium hydroxide, sodium hydroxide, lithium hydroxide, sulfuric acid, phosphoric acid, hydrochloric acid, nitric acid, acetic acid, ammonium chloride, sodium chloride, potassium chloride, lithium chloride, magnesium sulfate, sodium sulfate, potassium sulfate, lithium sulfate, zinc sulfate, aluminum nitrate, calcium nitrate, magnesium nitrate, lithium perchlorate, sodium perchlorate, potassium perchlorate, lithium borate, sodium borate, potassium borate, ionic liquids, deep eutectic solvents, gel electrolytes, and solid-state electrolytes.

In some embodiments, the supercapacitor has a specific capacity of 75 to 125 mAh/g. For example, the supercapacitor may have a specific capacity of 75.0 mAh/g, 77.5 mAh/g, 80.0 mAh/g, 82.5 mAh/g, 85.0 mAh/g, 87.5 mAh/g, 90.0 mAh/g, 92.5 mAh/g, 95.0 mAh/g, 97.5 mAh/g, 100.0 mAh/g, 102.5 mAh/g, 105.0 mAh/g, 107.5 mAh/g, 110.0 mAh/g, 112.5 mAh/g, 115.0 mAh/g, 117.5 mAh/g, 120.0 mAh/g, 122.5 mAh/g, or 125 mAh/g. In some embodiments, the supercapacitor has a specific capacity of 93 mAh/g.

In some embodiments, the supercapacitor retains at least 90%, preferably at least 91%, preferably at least 92%, preferably at least 93%, preferably at least 94%, preferably at least 95%, preferably at least 96%, of an initial capacitance after at least 100 charge-discharge cycles, preferably at least 250 charge-discharge cycles, preferably at least 500 charge-discharge cycles, preferably at least 750 charge-discharge cycles, preferably at least 1000 charge-discharge cycles, preferably at least 1250 charge-discharge cycles, preferably at least 1500 charge-discharge cycles, preferably at least 1750 charge-discharge cycles, preferably at least 2000 charge-discharge cycles, preferably at least 2250 charge-discharge cycles, preferably at least 2500 charge-discharge cycles, preferably at least 2750 charge-discharge cycles, preferably at least 3000 charge-discharge cycles, preferably at least 3250 charge-discharge cycles, preferably at least 3500 charge-discharge cycles, preferably at least 3750 charge-discharge cycles, preferably at least 4000 charge-discharge cycles, preferably at least 4250 charge-discharge cycles, preferably at least 4500 charge-discharge cycles, preferably at least 4750 charge-discharge cycles, preferably at least 5000 charge-discharge cycles. In some embodiments, the supercapacitor retains more than 90% of an initial capacitance after 5000 charge-discharge cycles.

The present disclosure also relates to a method of forming the polymer. In some embodiments, the polymer has repeating units having a structure of formula (1) and is substantially free of repeating units having a structure of formula (2). In some embodiments, the method includes reacting a dialdehyde of formula (3) with 1,5-diaminonaphthalene in a mixture including an alcohol having 1 to 5 carbon atoms, a halogenated organic solvent, and an organic acid having 1 to 5 carbon atoms to produce the polymer having repeating units having a structure of formula (1),

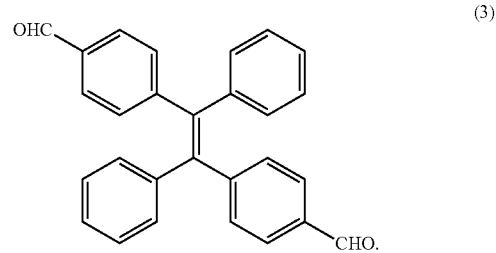

(3)

In general, the alcohol having 1 to 5 carbon atoms may be any suitable alcohol having 1 to 5 carbon atoms. Examples of alcohols having 1 to 5 carbon atoms include, but are not limited to, methanol, ethanol, n-propanol, isopropanol, n-butanol, 2-butanol, isobutanol, tert-butanol, n-pentanol, 2-pentanol, 3-pentanol, 2-methyl-1-butanol, 3-methyl-1-butanol (isopentanol, isoamyl alcohol), 2-methyl-2-butanol (tert-amyl alcohol), 2-methyl-3-butanol, 2,2-dimethylpropanol, cyclopropanol, cyclobutanol, cyclopentanol, ethylene glycol, 1,3-propanediol, 1,2-propanediol, propane-2,2-diol, 1,4-butanediol, 1,3-butanediol, and 1,2-butanediol. In some embodiments, the alcohol having 1 to 5 carbon atoms has one or two hydroxyl groups (i.e., is a mono-alcohol or a diol). In some embodiments, the alcohol having 1 to 5 carbon atoms has one hydroxyl group. In some embodiments, the alcohol having 1 to 5 carbon atoms is ethanol.

In general, the halogenated organic solvent can be any suitable halogenated organic solvent known to one of ordinary skill in the art. Examples of halogenated organic solvents include, but are not limited to chloroform, dichloromethane, carbon tetrachloride, trichloroethylene, tetrachloroethylene, 1,1,1-trichloroethane, 1,1,2-trichloroethane, chlorobenzene, fluorobenzene, 1,2-dichlorobenzene, 1,3-dichlorobenzene, 1,4-dichlorobenzene, 1,1-dichloroethene, 1,2-dichloroethene, 1,2,3-trichloropropane, 1,2,4-trichlorobenzene, bromobenzene, 1-bromo-3-chloropropane, 1-bromopropane, dibromomethane, bromoform, iodobenzene, 1-iodo-3-chloropropane, iodoform, pentachlorobenzene, hexachlorobenzene, chlorotoluene, dichlorotoluene, bromoform, chloroethane, 1-chloro-2-methylpropane, and hexachloroethane. In a preferred embodiment, the halogenated organic solvent is 1,2-dichlorobenzene.

In general, the organic acid having 1 to 5 carbon atoms may be any suitable organic acid having 1 to 5 carbon atoms. Examples of suitable organic acids having 1 to 5 carbon atoms include, but are not limited to, formic acid, propionic acid, butyric acid, valeric acid, lactic acid, glycolic acid, citric acid, malic acid, pyruvic acid, oxalic acid, succinic acid, malonic acid, methylmalonic acid, ethanesulfonic acid, 2-hydroxybutanoic acid, 2-methylpropanoic acid, 3-hydroxybutanoic acid, 2,3-dihydroxypropanoic acid, isobutyric acid, 3-hydroxy-2-methylpropanoic acid, dimethylmalonic acid, propanedioic acid, 2,2-dimethylpropanoic acid, ethylmalonic acid, 1-hydroxy-2-methylpropanoic acid, methanesulfonic acid, and 3,3-dimethylbutanoic acid. In a preferred embodiment, the organic acid having 1 to 5 carbon atoms is acetic acid.

In some embodiment, the method of reacting dialdehyde of formula (3) with 1,5-diaminonaphthalene is performed at 100 to 150° C., preferably 105 to 145° C., preferably 110 to 140° C., preferably 115 to 135° C., preferably 120 to 130° C., preferably 125° C.

In some embodiments, the polymer has repeating units having a structure of formula (2) and is substantially free of repeating units having a structure of formula (1). In some embodiments, the method includes reacting a tetraaldehyde of formula (4) with 1,5-diaminonaphthalene in a mixture comprising an alcohol having 1 to 5 carbon atoms, a halogenated organic solvent, and an organic acid having 1 to 5 carbon atoms to produce t the polymer having repeating units having a structure of formula (2),

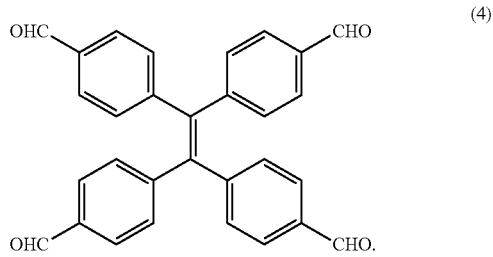

(4)

In general, the alcohol having 1 to 5 carbon atoms may be as described above. In some embodiments, the alcohol having 1 to 5 carbon atoms is n-butanol.

In general, the halogenated organic solvent may be as described above. In some embodiments, the halogenated organic solvent is 1,2-dichlorobenzene.

In general, the organic acid having 1 to 5 carbon atoms may be as described above. Some embodiments, the organic acid having 1 to 5 carbon atoms is acetic acid.

In some embodiment, the method includes reacting a tetraaldehyde of formula (4) with 1,5-diaminonaphthalene at a temperature of 100 to 150° C., preferably 105 to 145° C., preferably 110 to 140° C., preferably 115 to 135° C., preferably 120 to 130° C., preferably 125° C.

The present disclosure also relates to a method of forming the supercapacitor. In some embodiments, the method involves dispersing the polymer in a deposition solvent to form an electrolyte deposition slurry. In some embodiments, the electrolyte deposition slurry includes carbon black as described above. In some embodiments, the electrolyte deposition slurry includes polyvinylidene difluoride as described above. In some embodiments, the electrolyte deposition slurry includes an ionic substance as described above. In general, the electrolyte deposition slurry can include the components present in the electrolyte as described above. Such components can be present in similar ratios in the electrolyte and electrolyte deposition slurry.

In general, the deposition solvent can be any suitable organic solvent. Examples of organic solvents include, but are not limited to acetonitrile, dimethylformamide (DMF), acetone, N-methyl pyrrolidone (NMP), tetrahydrofuran (THF), hexamethylphosphoramide (HMPA), sulfolane, dimethylacetamide (DMAc), propylene carbonate, 7-butyrolactone, 1,3-dimethyl-2-imidazolidinone (DMI), 1,4-dioxane, ethylene carbonate, methylene chloride, chlorobenzene, toluene, anisole, nitromethane, benzonitrile, dimethyl sulfoxide, 2-methyl-2-pentanone, pyridine, N-ethyl pyrrolidone (NEP), 1-methyl-2-pyrrolidone, methyl ethyl ketone (MEK), dimethoxyethane, trichloromethane, 2,2,2-trifluoroethanolacetone, 1,2-butanediol, 1,3-butanediol, 1,4-butanediol, 2-butoxyethanol, butyric acid, diethanolamine, diethylenetriamine, dimethylformamide, ethanol, ethylamine, ethylene glycol, formic acid, furfuryl alcohol, glycerol, methanol, methyl diethanolamine, methyl isocyanide, 1-propanol, 1,3-propanediol, 1,5-pentanediol, 2-propanol, propanoic acid, propylene glycol, pyridine, tetrahydrofuran, and triethylene glycol.

In some embodiments, the method includes disposing the electrolyte comprising the polymer on the first electrode. In some embodiments, the electrolyte comprising the polymer is disposed on the first electrode such that the electrolyte forms a uniform film covering an entirety of a top surface of the first electrode. In some embodiments, the method involves placing onto the electrolyte the second electrode such that the second electrode is separated from the first electrode by the electrolyte to form the supercapacitor. In some embodiments, the method involves drying the electrolyte after the disposing. Such drying may remove the deposition solvent. Such drying may be performed before or after placing the second electrode.

EXAMPLES

The following examples demonstrate a polymer and a method of synthesis thereof for use in supercapacitors. The examples are provided solely for illustration and are not to be construed as limitations of the present disclosure, as many variations thereof are possible without departing from the spirit and scope of the present disclosure.

Example 1: Synthesis and Materials

The polymers were synthesized through a condensation reaction involving tetraphenylethene (TPE) derivatives di-(TPE-2CHO), a bifunctional aldehyde, and tetra-carboxaldehyde (TPE-4CHO) with 1,5-diaminonaphthalene (1,5-DAN). This led to the formation of conjugated polymer structures with enhanced electrochemical performance suitable for high-capacity energy storage.

Figure 1B:
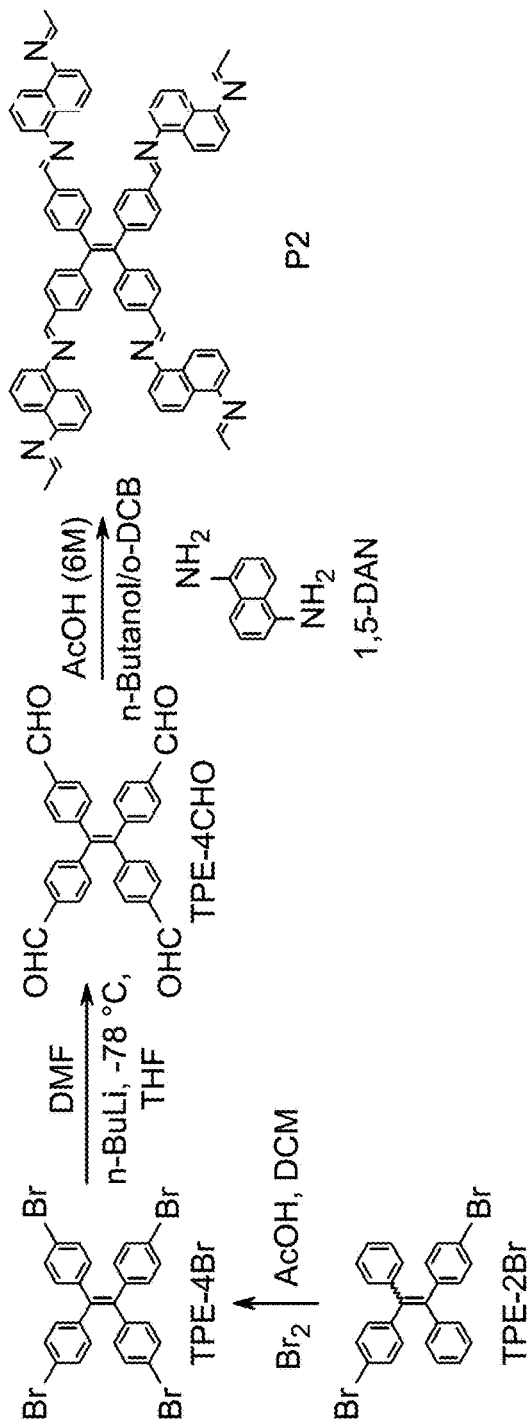
FIG. 1B illustrates a schematic synthesis of polymer P2 from TPE-2CHO, TPE-4CHO, and 1,5-DAN monomers, according to certain embodiments.

Materials for the preparation of the polymer included 4-bromobenzophenone (4-BBP), 1,5-diaminonaphthalene (1,5-DAN), titanium tetrachloride ($TiCl_4$), and Zinc (Zn) Powder purchased from Alfa Aesar (Germany). Additionally, n-BuLi (1.6 M in hexane) and anhydrous grade solvents including dichloromethane (DCM), tetrahydrofuran (THF), methanol ($CH_3OH$), dimethylformamide (DMF), glacial acetic acid ($C_2H_4O_2$), o-dichlorobenzene ($C_6H_4Cl_2$), n-butanol ($C_4H_{10}O$), hexane ($C_6H_{14}$), ethyl acetate ($C_4H_8O_2$), petroleum ether that is a mixture of alkanes with a boiling range 60° C.-80° C. were obtained from Sigma-Aldrich (Germany) and Acros Organics, respectively. Intermediate compounds were synthesized using the previously reported procedures, as shown in FIGS. 1A-1B.

Example 2: Preparation of 1,2-bis(4-bromophenyl)-1,2-diphenylethene (TPE-2Br)

In a 500 mL two-necked round-bottom flask equipped with a reflux condenser. A measured quantity of 10 grams (g) of 4-Bromobenzophenone (0.38 mol) and 7 g of zinc dust (0.106 mol), were added to the flask. The setup was subjected to vacuum evacuation and then purged with dry nitrogen three times. After introducing 150 mL of tetrahydrofuran (THF), the reaction mixture was cooled to a temperature 0° C. Subsequently, titanium tetrachloride (TiCl$_4$), weighing 11.44 g and measuring 6.6 mL (0.06 mol), was then added dropwise, while the temperature was gradually increased until it reached room temperature. The reaction underwent reflux throughout the duration of the night. Afterward, the reaction was allowed to cool down to the temperature of the surrounding environment. Once the majority of the solvent had evaporated, the remaining liquid was transferred into a 100 mL solution of 1 M hydrochloric acid (HCl) and subjected to three extractions using dichloromethane (DCM). The organic layer was subjected to brine and water washes, followed by drying using magnesium sulfate (MgSO$_4$). Further, the process involved filtration and solvent evaporation, the unrefined product underwent purification by silica gel column chromatography, with hexane being used as the eluent. The resulting white solid of 1,2-bis(4-bromophenyl)-1,2-diphenylethene (TPE-2Br) obtained with a yield of 7 g (76.4%).

Example 3: Preparation of 1-Bromo-4-[1,2,2-tris(4-bromophenyl)ethenyl]benzene (TPE-4Br)

Figure 10:
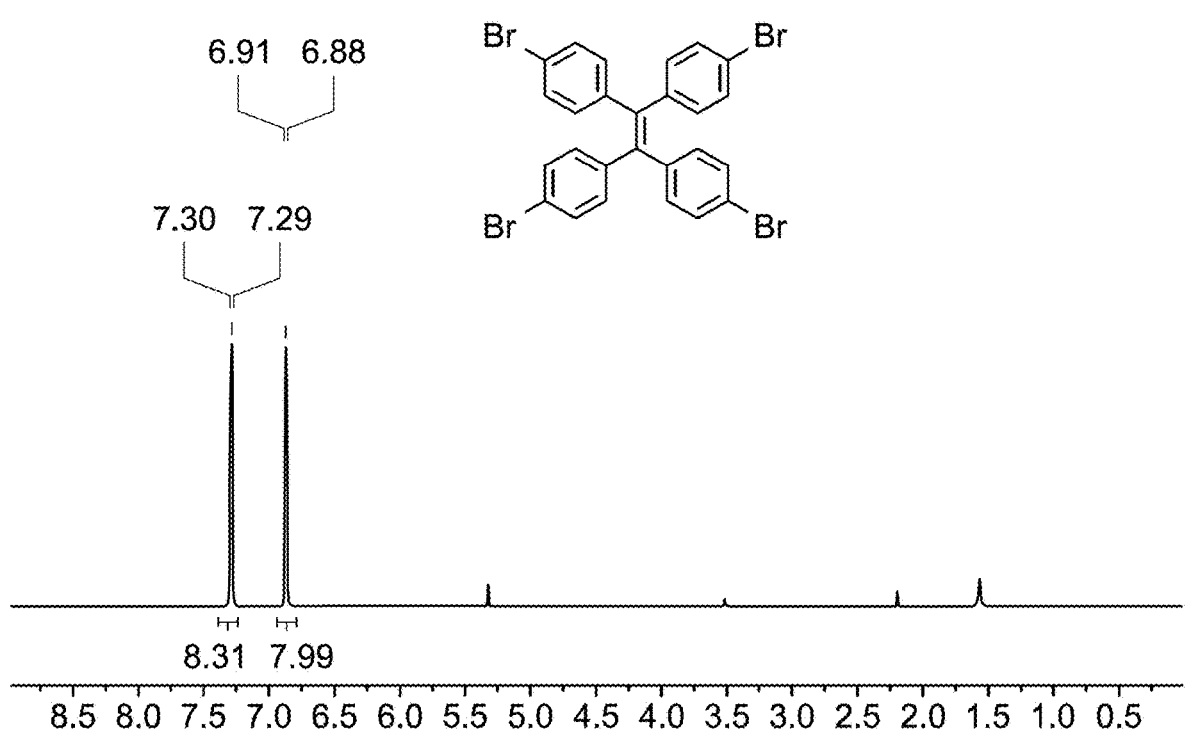
FIG. 10 shows proton nuclear magnetic resonance ($^1H$ NMR) spectrum of TPE-4Br in deuterated chloroform ($CDCl_3$), according to certain embodiments.
Figure 11:
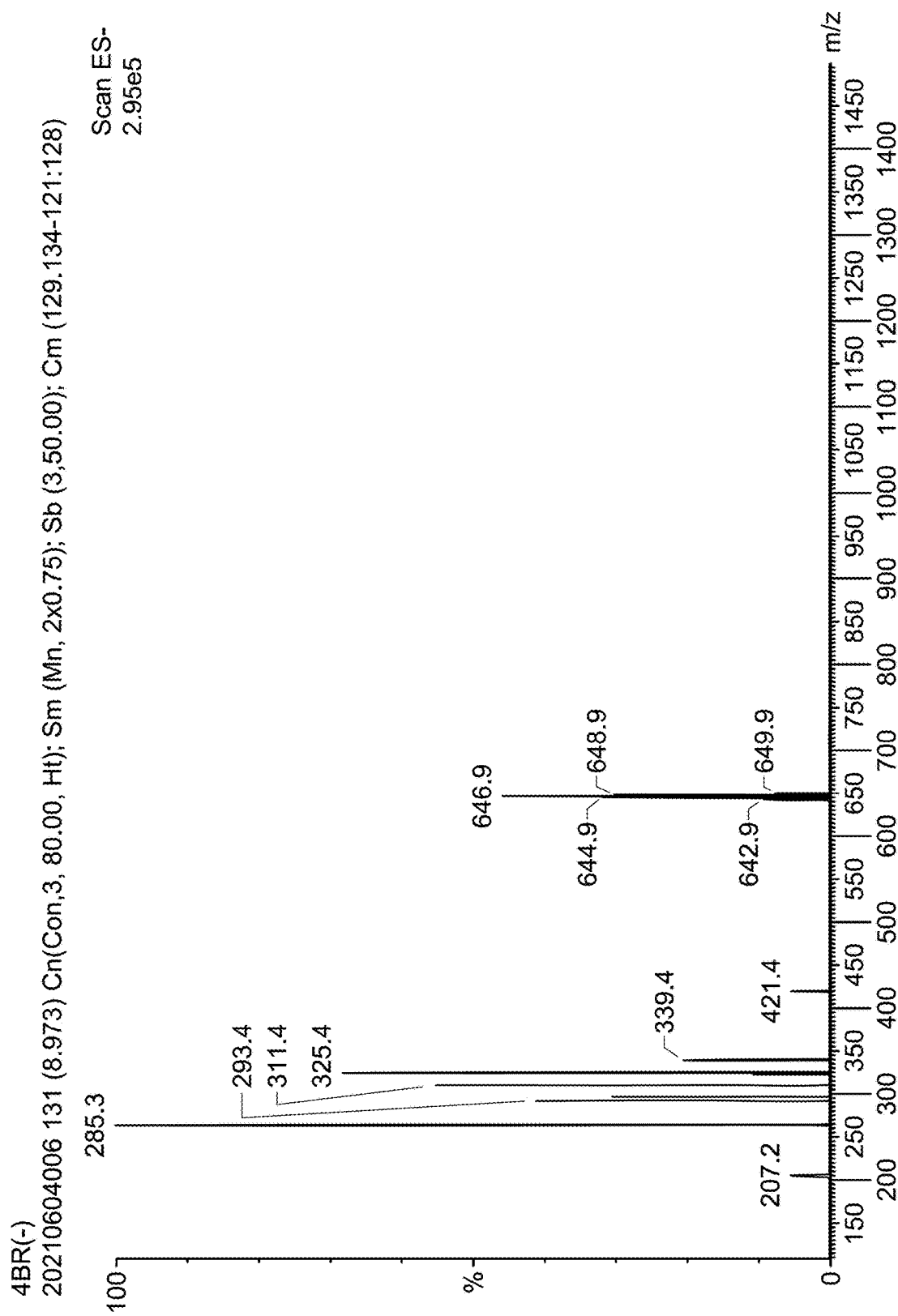
FIG. 11 shows low-resolution mass spectrum (LRMS) of TPE-4Br, according to certain embodiments.

A mixture of 8 g of 1,2-bis(4-bromophenyl)-1,2-diphenylethene (TPE-2Br), corresponding to 16.4 mmol, along with 20 mL of glacial acetic acid (CH$_3$COOH) and 80 mL of dichloromethane (DCM) was prepared. 5 mL of bromine (98 mmol), was then added to the mixture at a temperature of 0° C. The resultant mixture was then agitated at ambient temperature for 5 hours (h) and monitored using thin-layer chromatography (TLC). Subsequently, the reaction was transferred into 200 mL of cold water and subjected to extraction using DCM. The organic phase was dehydrated using MgSO$_4$, and the solvent was removed by applying decreased pressure. The raw product was further refined by silica gel column chromatography, using petroleum ether 60-80 as the solvent. 9 g of white solid of TPE-4Br (85% yield) was obtained. Proton nuclear magnetic resonance ($^1$H NMR), showed (300 MHz, CDCl$_3$, 25° C.) δ=6.87 (d, J=6 Hz, 8H; 8CH), 7.29 (d, J=6 Hz, 8H; 8CH), as shown in FIG. 10; MS [ESI$^-$]: m/z (%): calculated. 647.03, observed 646.9 [M-H]$^-$, as shown in FIG. 11.

Example 4: Preparation of 4,4'-(1,2-Diphenyl-1,2-ethenylene)dibenzaldehyde (TPE-2CHO)

Figure 12:
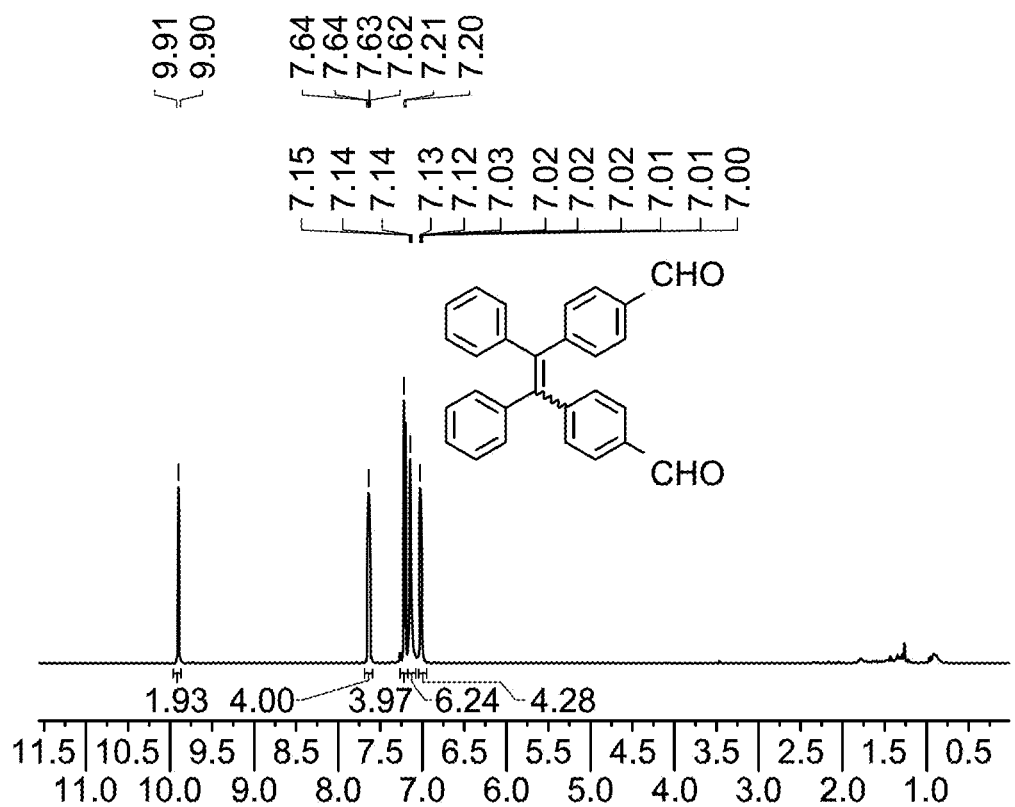
FIG. 12 shows $^1H$ NMR spectra of TPE-2CHO in $CDCl_3$, according to certain embodiments.
Figure 13:
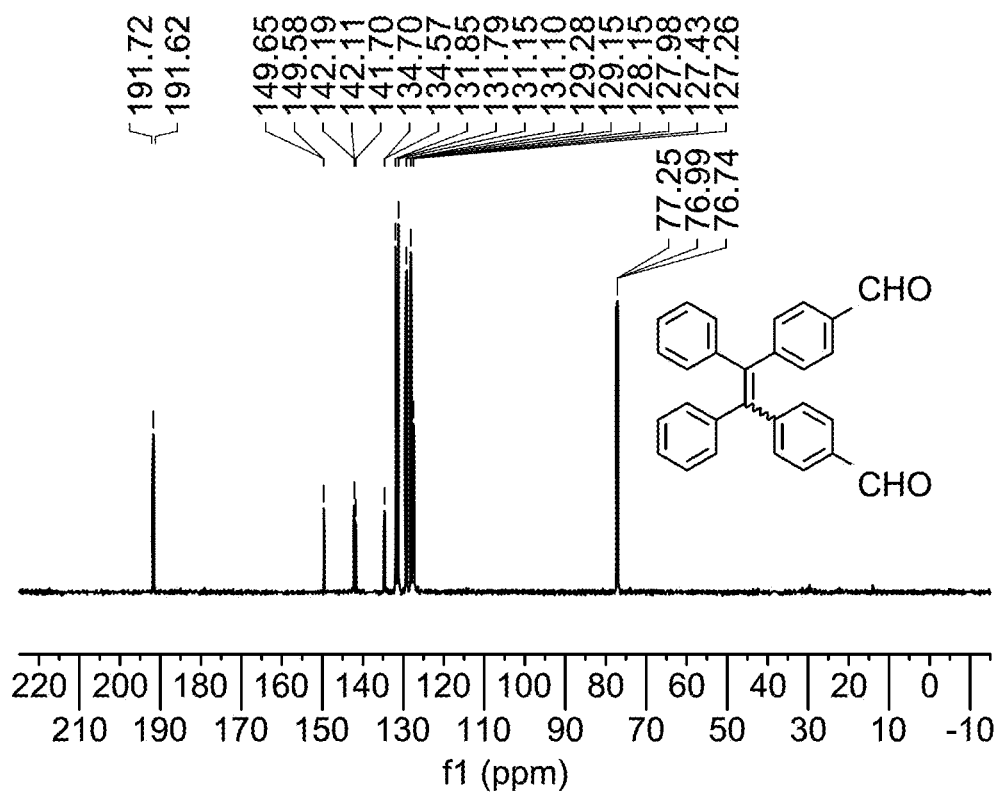
FIG. 13 shows carbon-13 nuclear magnetic resonance ($^{13}C$ NMR) spectrum of TPE-2CHO in $CDCl_3$, according to certain embodiments.
Figure 14:
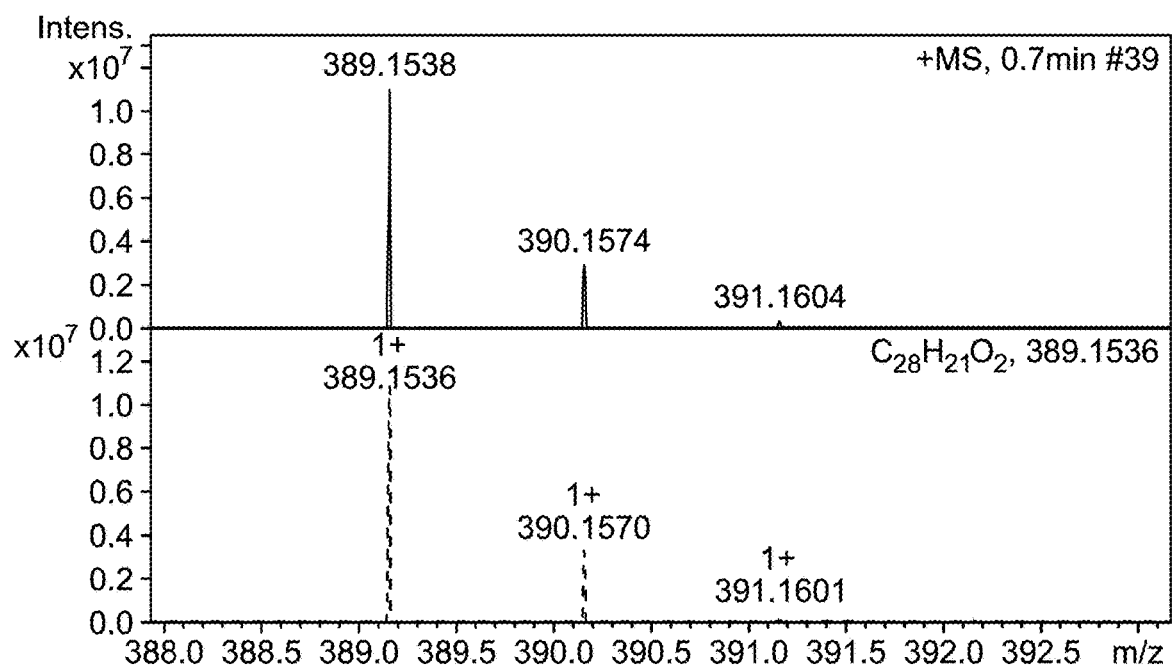
FIG. 14 shows high-resolution mass spectrum (HRMS) of TPE-2CHO, according to certain embodiments.

2.00 g (4.08 mmol) of compound TPE-2Br was dissolved in 50 mL of anhydrous THF and agitated. Then, 6.4 mL of n-butyllithium (n-BuLi) with a concentration of 1.6 moles per liter (M) in hexane (10.2 mmol), was added at a temperature of −78° C. under a nitrogen (N$_2$) atmosphere. The solution was agitated at this specific temperature for 2 hours, after which it was gradually heated to reach the ambient temperature. Followed by 1 hour of stirring, then the mixture was cooled to a temperature of −78° C. At this point, 0.9 g of DMF equivalent to 0.95 mL (12.24 mmol), was swiftly introduced into the mixture. The solution was agitated and allowed to reach the ambient temperature. To quench the reaction, a solution of HCl with a concentration of 2 M and a volume of 100 mL was added. After a 2-hour stirring period, the organic layer was isolated, and the aqueous layer was subjected to three runs of extraction using 100 mL of DCM each time. The organic layer was dehydrated using MgSO$_4$. Following the removal of solvent at decreased pressure, the remaining substance was refined using silica gel column chromatography. The eluent used was a mixture of hexane and ethyl acetate in a 4:1 volume-to-volume ratio. This process resulted in the formation of the intended product, which appeared as a yellow solid. The yield of the product was 0.8 g, (50%). $^1$H NMR (300 MHz, CDCl$_3$, 25° C.) δ=6.95-7.05 (m, 4H; 4CH), 7.10-7.17 (m, 4H; 4CH), 7.21 (d, J=3 Hz, 4H; 4CH), 7.63 (dd, J=1.5, 4.5 Hz, 4H; 4CH), 9.90 (s, $^1$H; 1CHO), 9.91 (s, $^1$H; 1CHO), as shown in FIG. 12; $^{13}$C NMR (75 MHz, CDCl$_3$, 25° C.) δ=127.26, 127.43, 127.98, 128.15, 129.15, 129.28, 131.10, 131.15, 131.79, 131.85, 134.57, 134.70, 141.70, 142.11, 142.19, 149.58, 149.65, 191.162, 191.72, as shown in FIG. 13; HRMS [ESI$^+$]: m/z (%): calcd. 389.1, observed 389.1 [M+H]$^+$, as shown in FIG. 14.

Example 5: Preparation of 4,4',4'',4'''-(ethene-1,1,2,2-tetrayl)tetrabenzaldehyde (TPE-4CHO)

Figure 15:
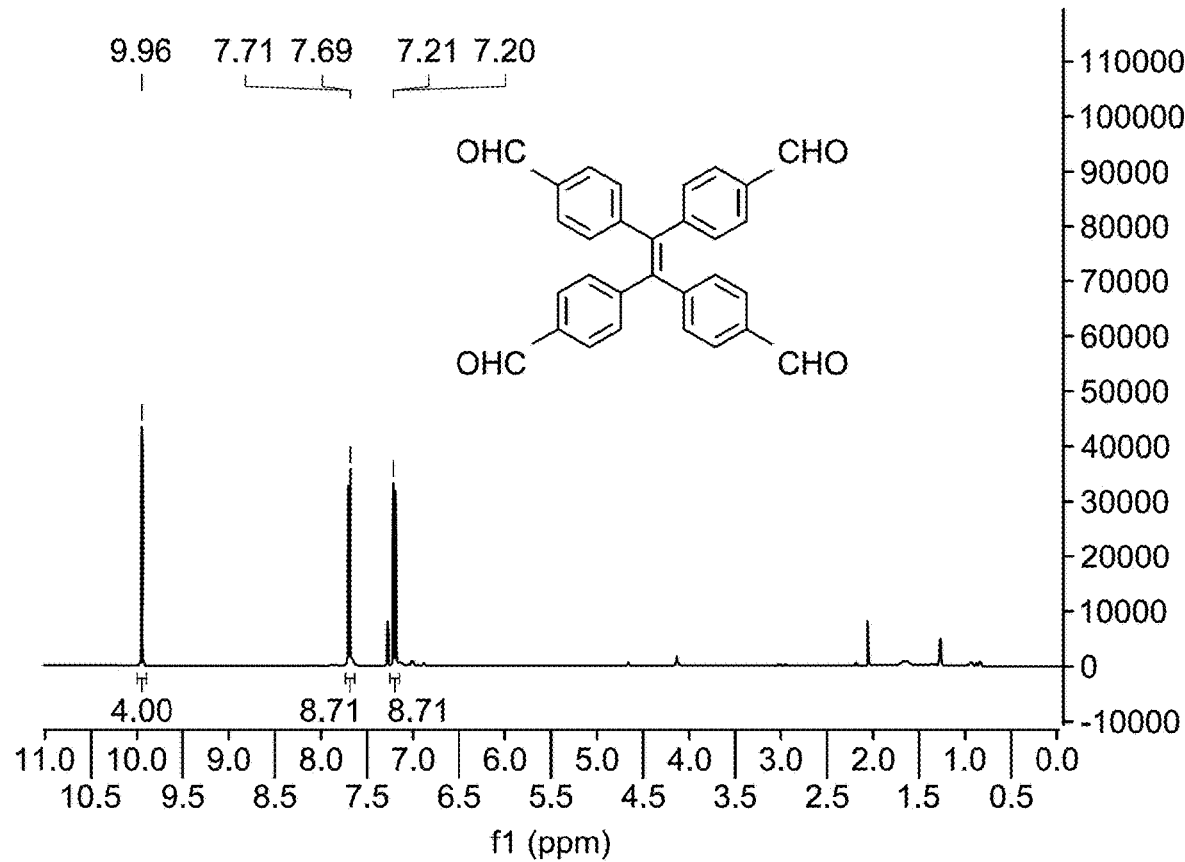
FIG. 15 shows the $^1H$ NMR spectrum of TPE-4CHO in $CDCl_3$, according to certain embodiments.
Figure 16:
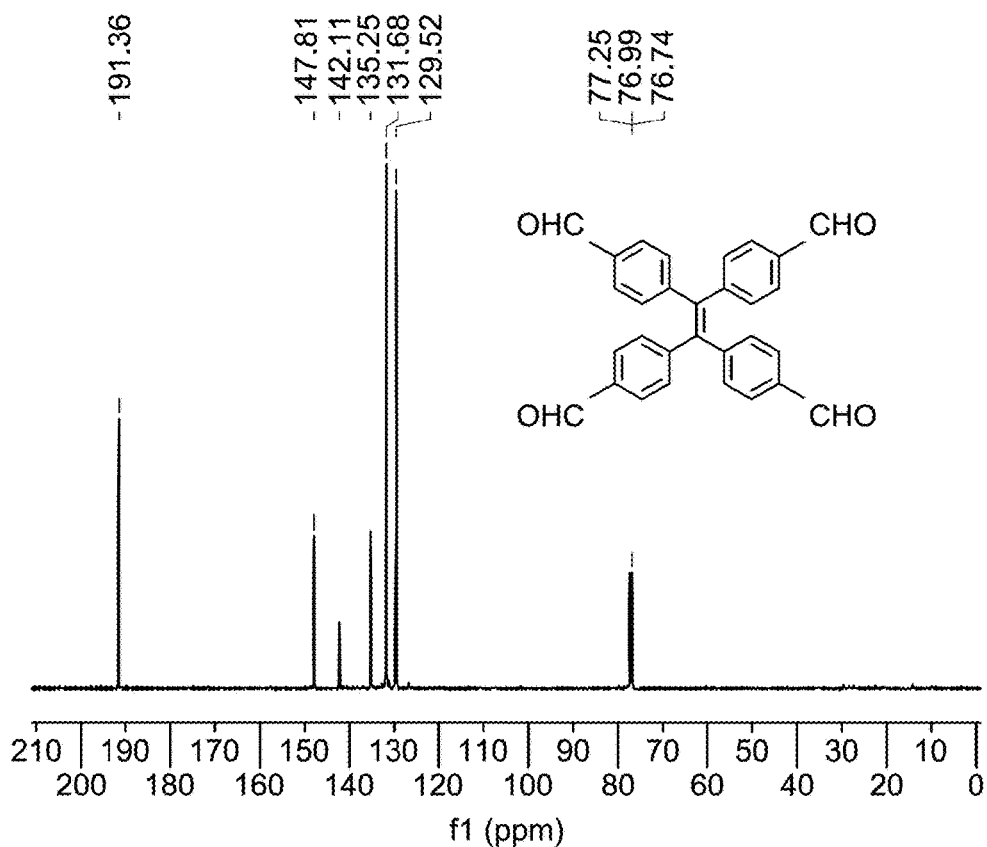
FIG. 16 shows the $^{13}C$ NMR spectrum of TPE-4CHO in $CDCl_3$, according to certain embodiments.
Figure 17:
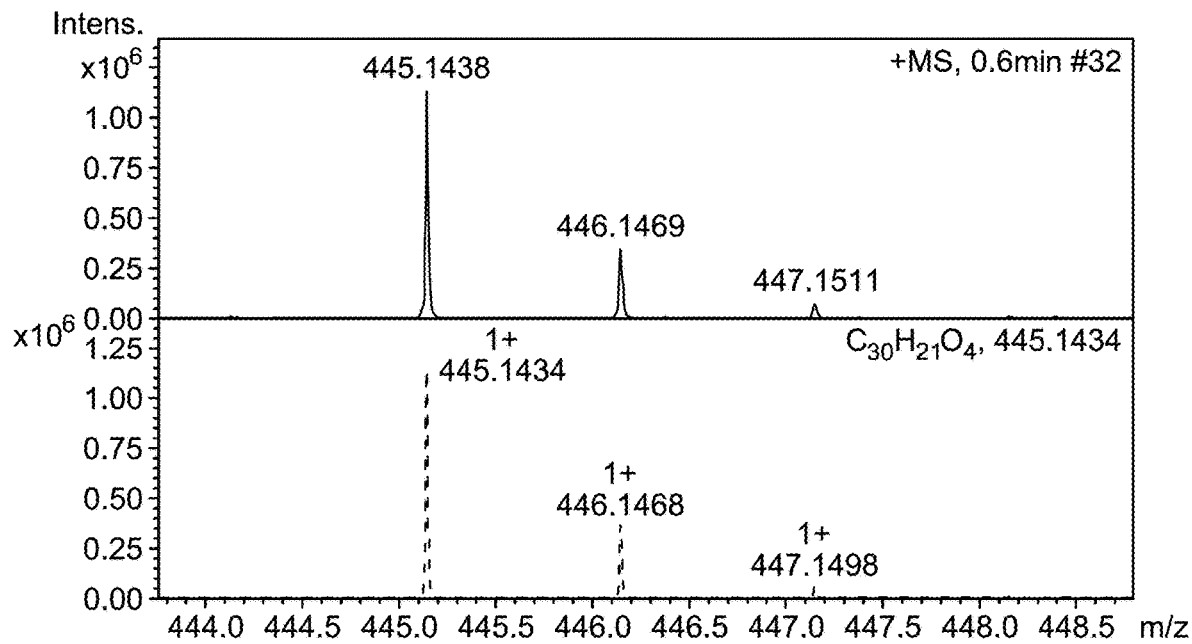
FIG. 17 shows the HRMS of TPE-4CHO, according to certain embodiments.

A solution of 5.00 g of 1-Bromo-4-[1,2,2-tris(4-bromophenyl)ethenyl]benzene (TPE-4Br) (7.76 mmol) was prepared in 50 mL of anhydrous THF and subjected to agitation. Subsequently, 25 mL of n-BuLi at a concentration of 1.6 M in hexane (39.5 mmol) was added dropwise at a temperature of −78° C. in the presence of a nitrogen (N$_2$) atmosphere. The solution was agitated at this specific temperature for 2 hours, after which it was gradually heated to reach the ambient temperature. Following 1 hour of stirring, the mixture was further cooled to a temperature of −78° C. At this point, 3.49 g of DMF, equivalent to 3.7 mL (47.49 mmol) was introduced into the reaction mixture in a single addition. The solution was agitated and slowly allowed to reach the temperature of the surrounding environment. To quench the reaction, a solution of HCL with a concentration of 2 M and a volume of 100 mL was introduced. After 2 hours of stirring, the organic layer was isolated, and the aqueous layer was subjected to three extractions using 100 mL of DCM each time. The organic layer was dehydrated using MgSO$_4$. Following the removal of solvent at lower pressure, the remaining substance was refined by silica gel column chromatography, utilizing DCM as the solvent. This process yielded the intended product in the form of a yellow solid, with a yield of 2.5 g (72%). $^1$H NMR (300 MHz, CDCl3, 25° C.) δ=7.21 (d, J=3 Hz, 8H; 8CH), 7.70 (d, J=6 Hz, 8H; 8CH), 9.96 (s, 4H; 4CHO), as shown in FIG. 15; $^{13}$C NMR (75 MHz, CDCl$_3$, 25° C.) δ=129.52, 131.68, 135.25, 142.11, 147.81, 191.36, as shown in FIG. 16; HRMS [ESI$^+$]: m/z (%): calculated. 445.1434, observed 445.1438 [M+H]$^+$, as shown in FIG. 17.

Example 6: Synthesis of Polymers P1 and P2

50.00 mg of 1,5-diaminonaphthalene (1,5-DAN) (0.31 mmol) was combined with either 124 mg (0.32 mmol) of TPE-2CHO for P1 or 62 mg (0.16 mmol) of TPE-4CHO for P2. The reaction components were placed in a 25 mL Pyrex tube with a combination of n-butanol and o-dichlorobenzene in a 1:1 ratio (10 mL) and 1.00 mL of 6 M acetic acid. The tube was sealed and underwent three freeze-pump-thaw cycles to remove gases. Afterward, the tube was securely closed using a flame and subjected to a temperature of 120° C. for 3 days. Once the tube had cooled down to the temperature of the surrounding room, it was opened. The resultant yellow solid was separated by passing it through a filter and then washed consecutively with DCM, THF, methanol, DMF, and acetone. Subsequently, the solid was subjected to vacuum drying at a temperature of 120° C. for the duration of one night, leading to the production of yellow powders denoted as P1 and P2.

Example 7: Characterization Instruments

The purity of the compounds was verified using $^1$H NMR (proton nuclear magnetic resonance), $^{13}$C NMR (carbon-13 nuclear magnetic resonance), and mass spectrometry (MS) methods. The tetraphenylethene compounds were analyzed using a VARIAN AS500 MHz instrument to obtain the NMR spectra. Chemical shifts (δ) were measured in parts per million (ppm), whereas coupling constants (J) were represented in Hertz (Hz). The multiplicities were denoted as follows: s=singlet, d=doublet, t=triplet, m=multiplet, br=wide. The micromass Q-TOF MS spectrometer was used to acquire high-resolution mass spectra (HR-MS). The data for X-ray diffraction (XRD) was obtained using a Bruker D8 advance diffractometer. The Fourier transform infrared (FT-IR) spectra were obtained using a perkin elmer spectrum 100 series spectrometers. The Evolution 220 equipment (Thermo Fisher Scientific, UK) was used to obtain spectra by DRS. SEM images were recorded using Thermon Fisher Quattro S felid emission gun microscopy (USA).

Example 8: Electrode Preparation

Polymeric samples P1 and P2 were used as electroactive materials for electrode preparation. A slurry including P1 or P2, carbon black, and polyvinylidene difluoride (PVDF) was prepared in weight ratios of 70:20:10 using N-methyl-2-pyrrolidone (NMP) as the solvent. The mixture was stirred at room temperature overnight to ensure uniform dispersion. It was homogenously distributed in a nickel foam (NF) of 1 centimeter square (cm$^2$)×1 cm$^2$, followed by a drying process for next 12 hours at a temperature of 90° C. The NF piece containing the material was then squeezed into a pristine NF (1 cm$^2$×2 cm$^2$).

Example 9: Characterization and Experimental Data

Electrochemical tests, including cyclic voltammetry (CV), galvanostatic charge-discharge cycling (GCDC), linear sweep voltammetry (LSV), and electrochemical impedance spectroscopy (EIS), were conducted using an electrochemical workstation (Corrtest®, CS350, Wuhan, China). A three-electrodes setup was used with platinum (Pt) mesh serving as the counter electrode and mercury/mercury oxide (Hg/HgO) as the reference electrode. A potassium hydroxide (KOH, 6 M) solution was used as the electrolyte. The evaluations were conducted using a potential ranging from 0.2 volt (V) to 0.6 V. The scanning frequencies used in the present disclosure were 1 millivolt per second (mV/s), 2 mV/s, 3 mV/s, 5 mV/s, 10 mV/s, 20 mV/s, 30 mV/s, 50 mV/s, 100 mV/s, and 200 mV/s. The experimental data for the GCDC study was acquired using current densities of 1 ampere per gram (A/g), 3 A/g, 5 A/g, 10 A/g, 20 A/g, 30 A/g, 50 A/g, and 100 A/g.

The electrochemical impedance spectroscopy (EIS) measurements were recorded at a frequency range of 100 megahertz (MHz) to 0.1 hertz (Hz). The specific capacitance (C) was determined using galvanostatic charge-discharge (GCDC) data and applying the following equation (1), $$\text{Specific capacitance } (C) = I \times \Delta t m \times \Delta V \quad (1)$$

Where, the symbol C (F/g) is employed to denote the specific capacitance, I (A) is the current, Δt (s) is employed to represent the discharge time, ΔV (V) is utilized to represent the potential window, and m (g) is utilized to signify the mass of the active material.

The polymerization process was initiated using tetraphenylethene (TPE) derivatives and 1,5-diaminonaphthalene (1,5-DAN) as core components, forming the π-conjugated backbone needed for electrochemical properties. Two distinct conjugated polymers, P1 and P2, were synthesized with slight variations in monomeric composition and size, indicating to differences in electrochemical behavior. P1 and P2 have spherical morphologies, with particle sizes of 6.8±1 μm and 0.97±0.1 μm, respectively. Furthermore, P1 exhibited higher capacitance, potentially due to its larger particle size and more favorable structural arrangement and P2 demonstrated demonstrated slightly lower capacitance but retains excellent performance metrics with respect to charge/discharge efficiency and cycling stability.

The CV analysis of polymers P1 and P2 showed reversible oxidation-reduction behavior, which was characteristic of faradaic charge storage mechanisms. This confirmed that the polymers not only store charge electrostatically like capacitors but also utilize charge transfer processes in faradaic to increase energy storage capacity.

The capacitance observed at a scan rate of 1 mV/s, the specific capacitance for P1 was 274.8 F/g and for P2 was 207.9 F/g. These values were significantly higher than typical capacitors made from carbon-based materials, which generally exhibit specific capacitance values ranging from 100 F/g to 200 F/g.

The charge-discharge cycles evaluated for polymers showed excellent cycle stability, with less than 10% capacitance loss after 5000 charge-discharge cycles. This demonstrated an improvement over many conventional supercapacitor materials, which typically show greater degradation over time, with capacitance loses of up to 20% to 30% after 1000 cycles to 2000 cycles.

Impedance Spectroscopy (EIS) examined for polymers exhibited low charge transfer resistance, as indicated by the Nyquist plot analysis. The observations suggested conductivity and efficient electron movement within the polymer structure, facilitating fast charge and discharge.

Fourier Transform Infrared (FT-IR) spectroscopy identified the characteristic functional groups in the conjugated polymers, confirming successful polymerization and the presence of necessary electroactive sites for charge storage.

Solid-State $^{13}$C nuclear magnetic resonance ($^{13}$C NMR) spectroscopy confirmed the chemical structure of the conjugated polymers, revealing the regularity of the conjugation and the successful incorporation of the TPE and 1,5-DAN monomers into the polymer backbone.

Scanning electron microscopy (SEM) provided morphological details, showing that the polymers adopt spherical shapes, with sizes in the micrometer range, consistent with the desired particle dimensions for enhanced electrochemical performance.

X-ray Diffraction (XRD) and diffuse reflectance spectroscopy (DRS) analysis indicated that the polymers possess a relatively low bandgap around 2.3 eV to 2.4 eV, which improves conductivity and allowed for broader light absorption in the UV-visible range between 200 nanometers (nm) to 466 nm.

Example 10: Physical and Chemical Characterization

Two new polymers, P1 and P2 were synthesized using tetraphenylethene (TPE) monomers containing two and tetra-carbonyl groups. The synthesis procedures of the monomers, as shown in FIGS. 1A-1B. Briefly, the McMurry coupling of 4-bromobenzophenone gave TPE-2Br. Bromination of TPE-2Br was then performed using bromine in a mixture of glacial acetic acid and anhydrous DCM to give TPE-4Br in quantitative yields. The $^1$H NMR spectra showed two peaks at δ=6.87 and 7.29 ppm respectively integrated with 8 protons for each peak corresponding to the formation of TPE-4Br. The corresponding bromo compounds were reacted with n-butyl lithium followed by a reaction with DMF at suitable conditions to afford monomers TPE-2CHO and TPE-4CHO respectively, as shown in FIGS. 1A-1B. The NMR and high-resolution mass spectrometry confirmed the formation of monomers TPE-2CHO and TPE-4CHO respectively. Finally, the polymerization of TPE-2CHO and TPE-4CHO with 1,5-DAN under solvothermal condensation conditions was carried out in 6 M n-butanol/1,2-dichlorobenzene/acetic acid at 120° C. for 72 h yielding the target polymers P1 and P2 with a high isolated yield of 70%, as achieved by researchers of the present disclosure.

Figure 2A:
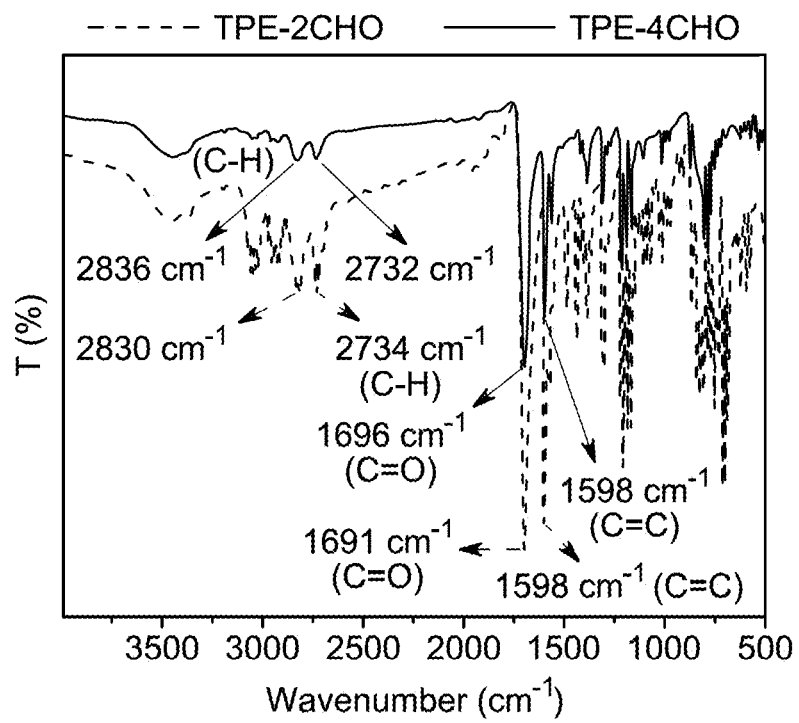
FIG. 2A shows Fourier transform infrared (FT-IR) spectra of TPE-2CHO and TPE-4CHO, according to certain embodiments.
Figure 2B:
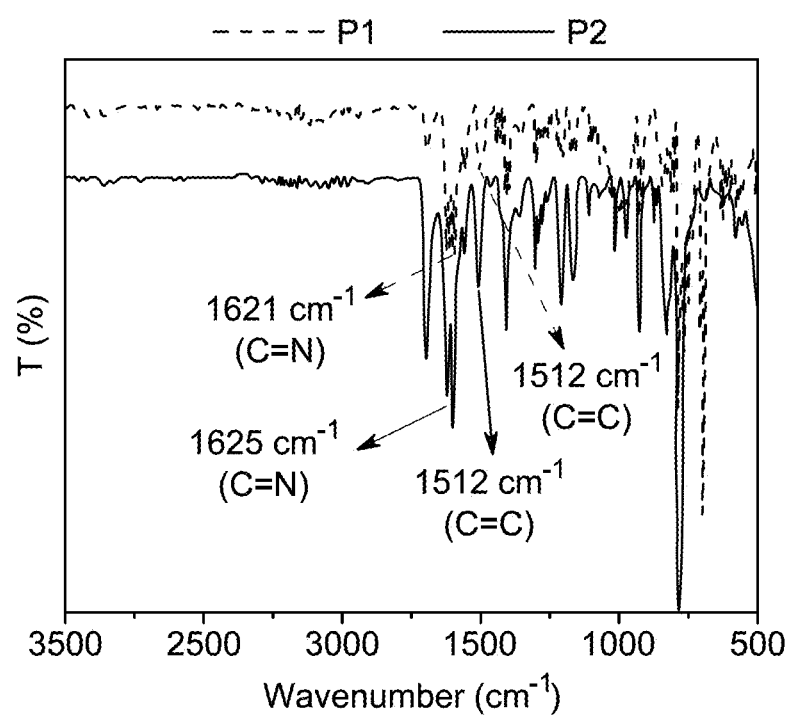
FIG. 2B shows the FT-IR spectra of P1 and P2 polymers, according to certain embodiments.
Figure 3A:
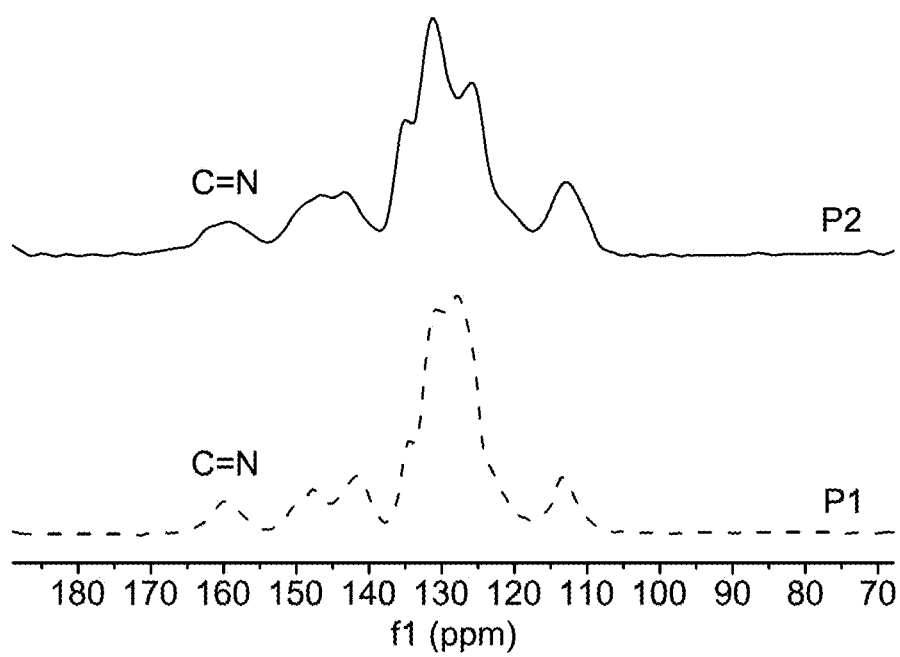
FIG. 3A shows $^{13}C$ cross-polarization magic angle spinning solid-state NMR of P1 and P2, according to certain embodiments.
Figure 3B:
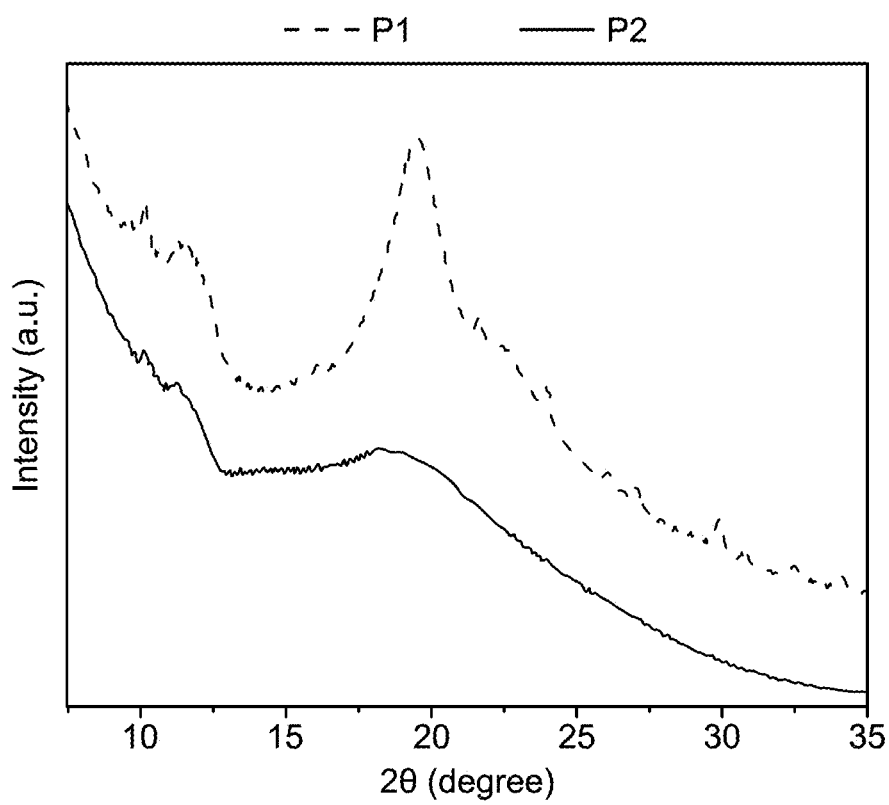
FIG. 3B shows X-ray diffraction (XRD) pattern of P1 and P2, according to certain embodiments.
Figure 4A:
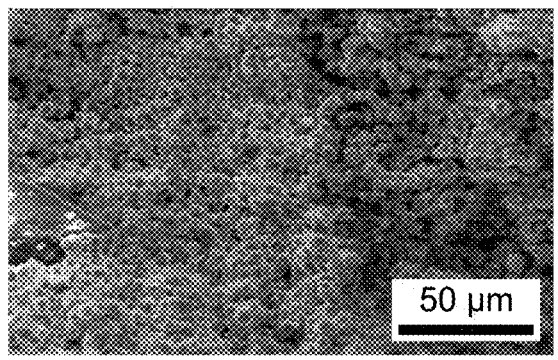
FIG. 4A shows a scanning electron microscopic (SEM) image of P1 at a magnification of 50 micrometers (μm), according to certain embodiments.
Figure 4C:
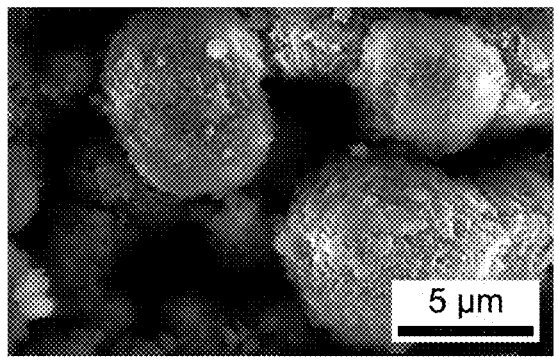
FIG. 4C shows a SEM image of P1 at a magnification of 5 μm, according to certain embodiments.
Figure 4B:
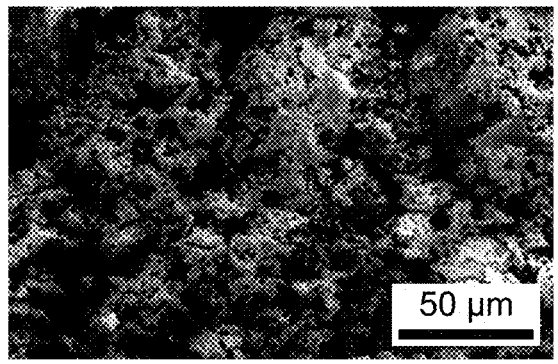
FIG. 4B shows a SEM image of P2 at a magnification of 50 μm, according to certain embodiments.
Figure 4D:
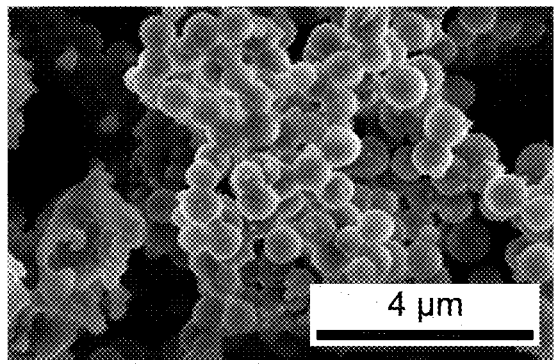
FIG. 4D shows a SEM image of P2 at a magnification of 4 μm, according to certain embodiments.

P1 and P2 were characterized using FT-IR, solid-state $^{13}$C NMR spectroscopy, XRD, and SEM. The FT-IR profile for TPE-2CHO showed absorption bands at 2830 and 2734 $cm^{-1}$ characteristic of C—H stretching vibrations and 1691 $cm^{-1}$ for C=O of the formyl group (CHO) group, as shown in FIG. 2A. Similarly, the FT-IR for TPE-4CHO exhibited characteristic bands at 2836 $cm^{-1}$ and 2732 $cm^{-1}$, which were ascribed to the stretching vibrations of C—H (aldehyde) and band at 1696 $cm^{-1}$ for C=O, as shown in FIG. 2A. The FT-IR spectra of P1 and P2 exhibited the imine linkage (C=N) stretching vibrations at 1621 $cm^{-1}$ and 1625 $cm^{-1}$ for P1 and P2, respectively with the disappearance of the characteristic peaks for the formyl and amine groups confirming the great degree of imine-linkage formation, as shown in FIG. 2B. The solid-state $^{13}$C NMR spectra for P1 and P2 showed signals at 159.45 ppm to 159.95 ppm for the imino-carbon bond and the disappearance of the signal for the CHO carbon bond which confirms the chemical structures of P1 and P2, as shown in FIG. 3A. The XRD patterns for P1 and P2 were reported, as shown in FIG. 3B. The XRD patterns of polymers P1 and P2 exhibited broad peaks with high background. Based on the data analysis, the polymers were low crystalline or have amorphous structures. The patterns showed peaks that were difficult to index, as shown in FIG. 3B.

The morphology of polymers, P1 and P2, was determined using SEM images, as shown in FIGS. 4A-4D. SEM images of the P1 and P2 indicated particles with spherical morphology. Particle size analysis indicates the synthesis of particles with diameters of 6.8±1 μm and 0.97±0.1 μm for P1 and P2, respectively. SEM images revealed the formation of polymer microspheres, as shown in FIGS. 4A-4D.

Figure 5A:
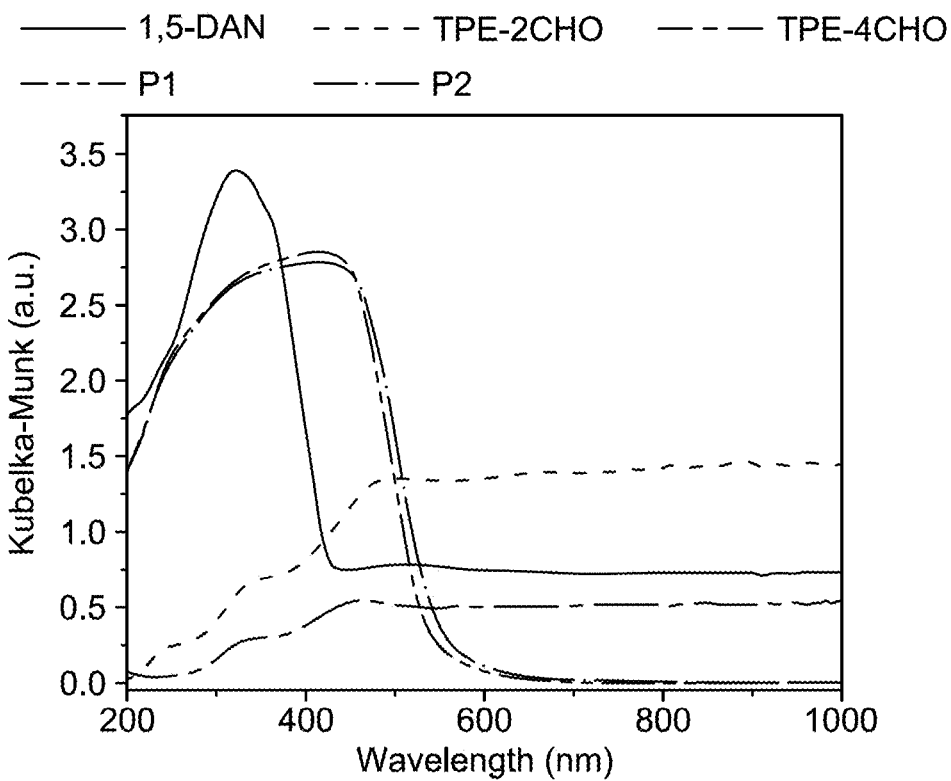
FIG. 5A is a diffuse reflectance spectroscopy (DRS) spectrum for 1, 5-DAN, TPE-2CHO, TPE-4CHO, P1 and P2 polymers, according to certain embodiments.
Figure 5B:
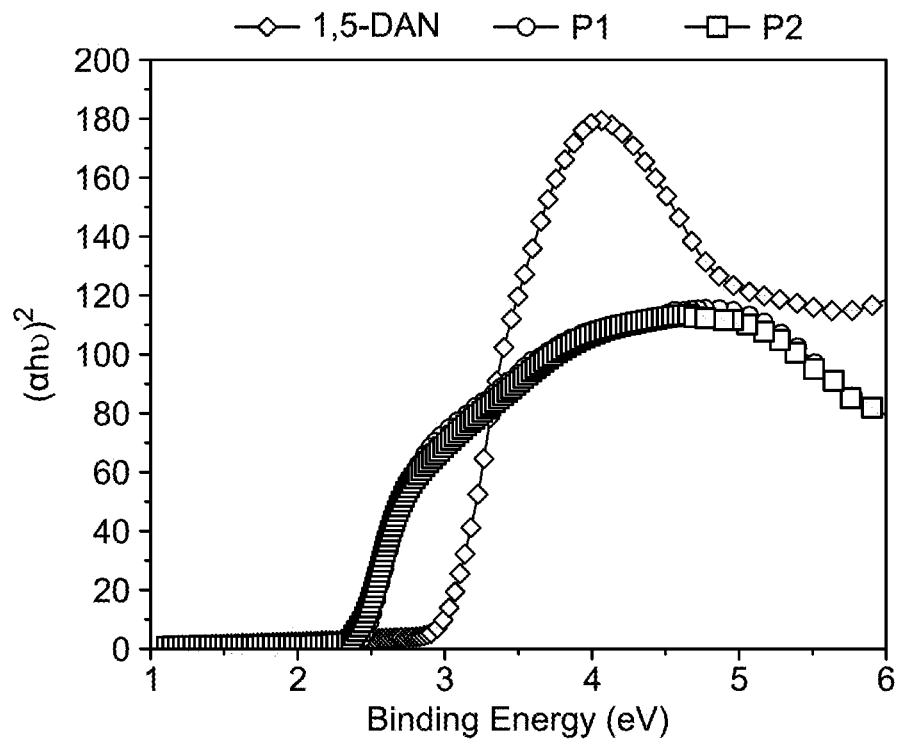
FIG. 5B shows Tauc's plot for 1, 5-DAN, P1 and P2 polymers, according to certain embodiments.

Optical properties of P1 and P2 were evaluated using DRS, as shown in FIG. 5A and Tauc's plot, as shown in FIG. 5A. The monomers, 1,5-DAN, TPE-2CHO, and TPE-4CHO, of the polymers were also included for comparison. Both aldehyde compounds, i.e., TPE-2CHO, and TPE-4CHO, displayed similar absorption spectra. At the same time, 1,5-DAN showed a different absorption spectrum. The spectra displayed absorption at 320 nm, as shown in FIG. 5A. After polymerization, the new material exhibited different absorption spectra compared to the starting materials. At the same time, the two polymers showed similar absorption spectra. P1 and P2 displayed broad absorption of 200 nm to 466 nm with maximum absorption at wavelength 425 nm, as shown in FIG. 5A. DRS spectra confirmed the successful coupling of two precursors i.e., 1,5-DAN, TPE-2CHO/TPE-4CHO into new products i.e., P1 and P2. The optical bandgap of the two polymers was determined using Tauc's plot, as shown in FIG. 5B. Analysis of the data indicated a band gap of 3 eV, 2.3 eV, and 2.4 eV for 1.5 DAN, P1, and P2, respectively, as shown in FIG. 5B. In the present disclosure, polymers exhibited good optical properties with a low bandgap due to the conjugation in the chemical structure.

Example 11: Electrical Characterization

Figure 6A:
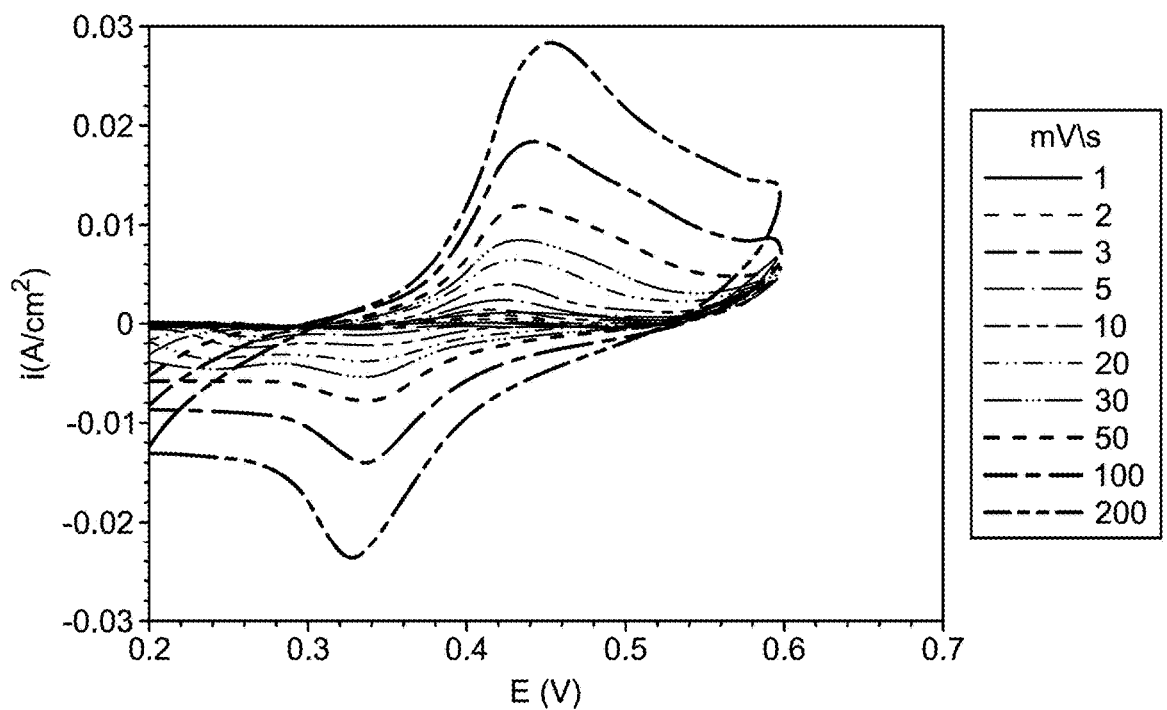
FIG. 6A is a cyclic voltammogram (CV) curve for P1 polymer, according to certain embodiments.
Figure 6B:
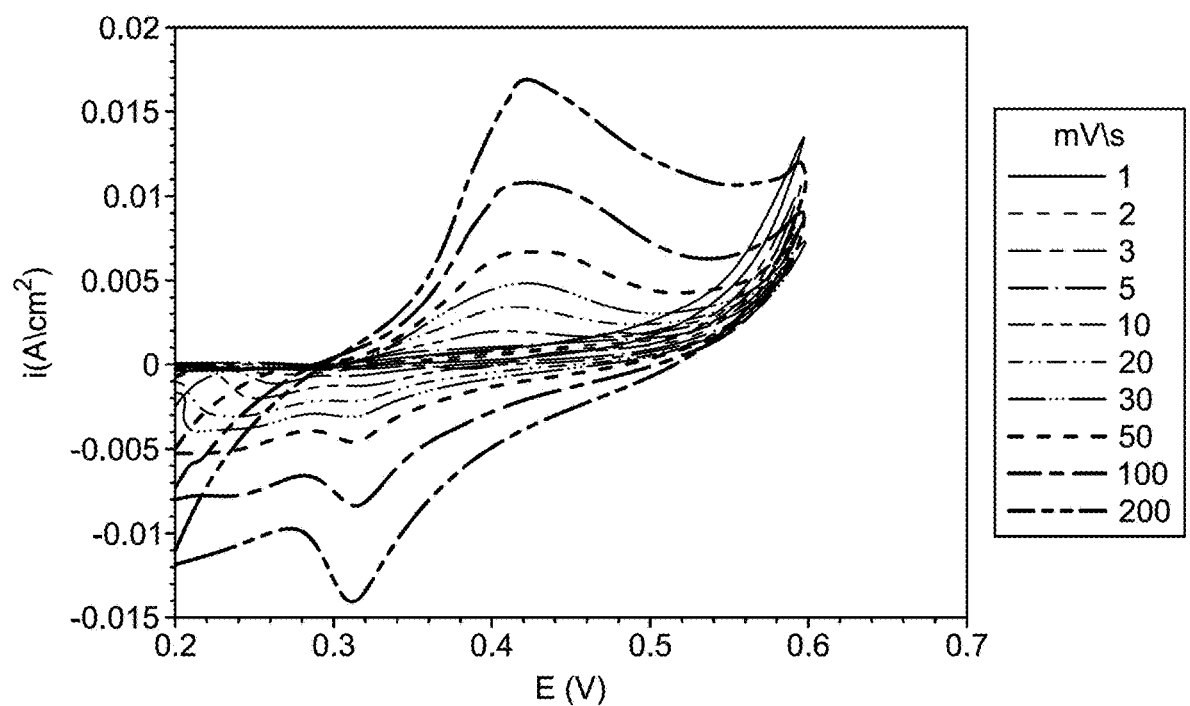
FIG. 6B depicts CV curve for P2 polymer, according to certain embodiments.
Figure 6C:
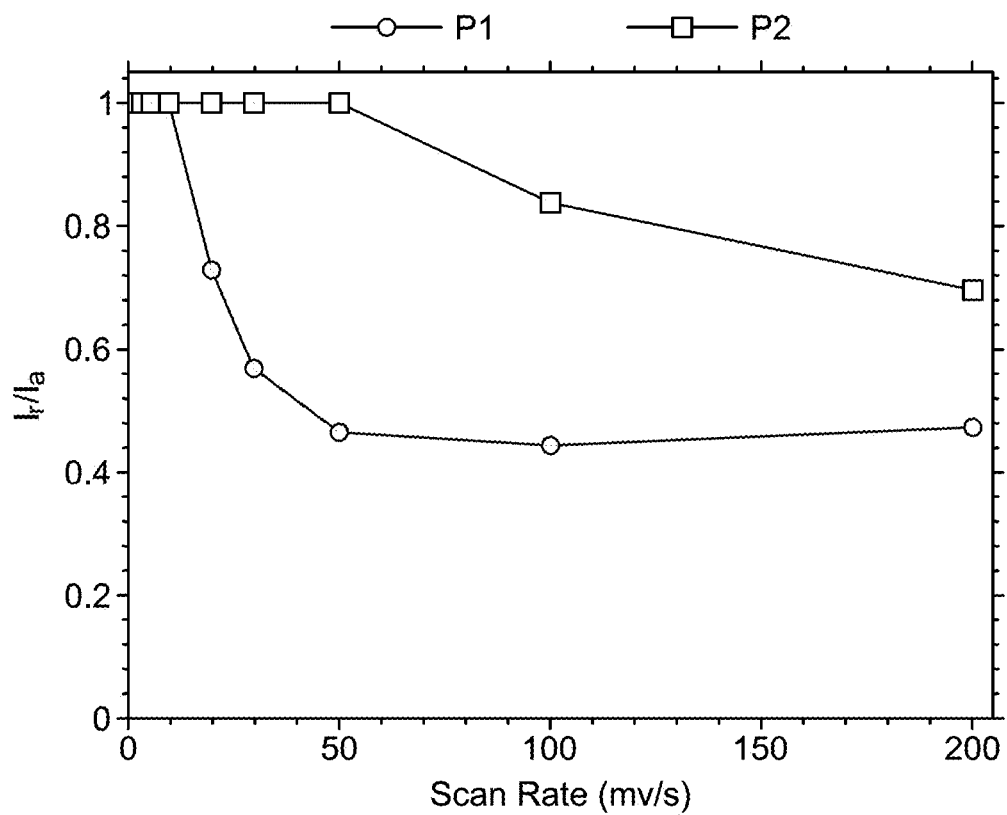
FIG. 6C shows relationship of cathodic and anionic current for P1 and P2 polymers, according to certain embodiments.
Figure 7A:
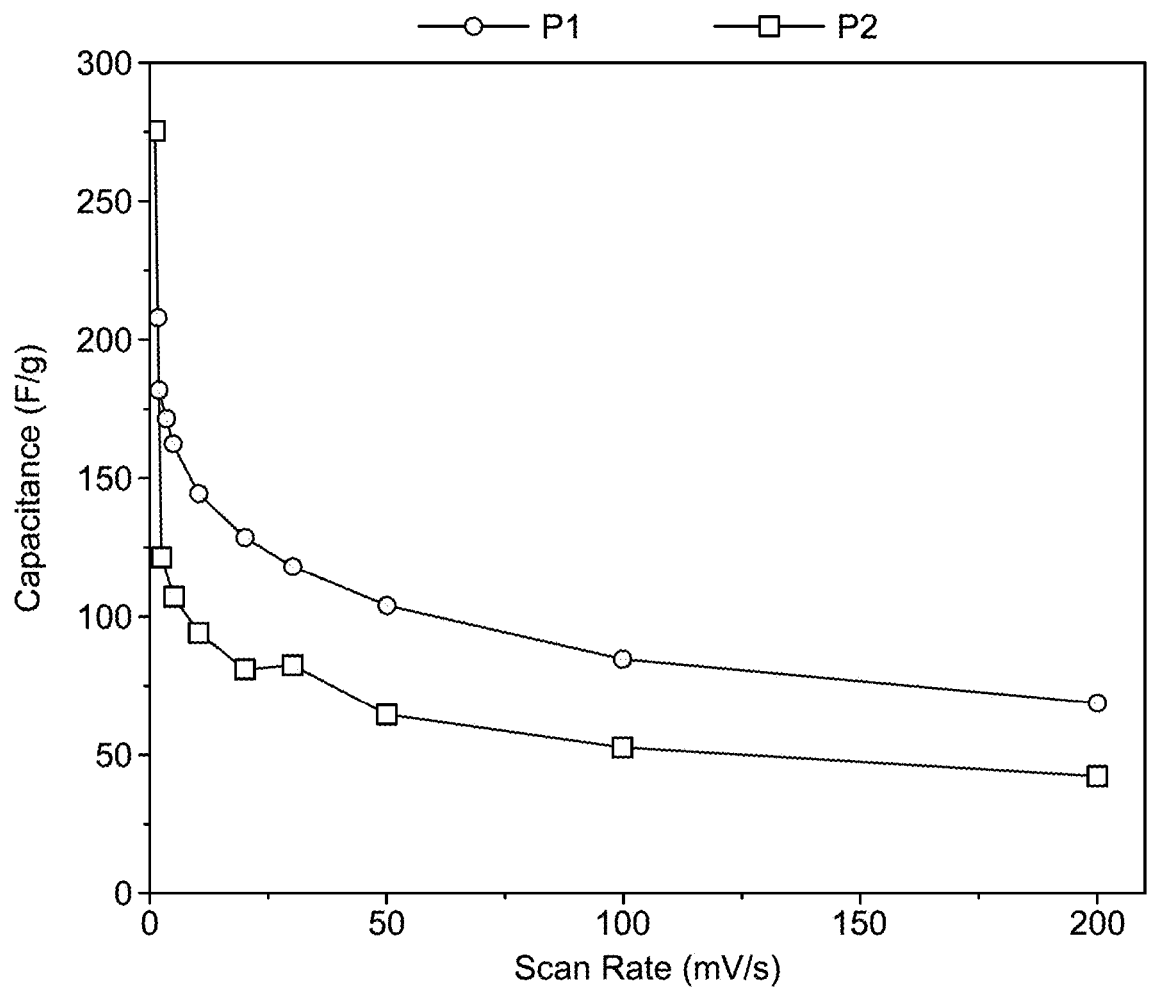
FIG. 7A shows capacitance versus scan rate for P1 and P2 polymers, according to certain embodiments.

As shown in FIGS. 6A-6B illustrated CV curves for P1 and P2, respectively, which illustrate the correlation between current (i) and electrode potential (E) during a cycle potential sweep in the potential range of 0.2 V to 0.6 V. Both graphs showed a reversible oxidation-reduction peak, which signified an electron transfer mechanism in which the polymer undergoes oxidation and reduction at a certain potential. The potential of oxidation/reduction peaks varied based on the structure of P1 and P2. The observation suggested potential disparities in the susceptibility of the polymers to undergo oxidation or reduction between the two polymers. The effect of the scan rate was recorded using values of 1 mV/s, 2 mV/s, 3 mV/s, 5 mV/s, 10 mV/s, 20 mV/s, 30 mV/s, 50 mV/s, 100 mV/s, and 200 mV/s, as shown in FIGS. 6A-6B. The scan rate referred to the speed at which the potential was swept. There was an insignificant change in the peak position for both polymers. On the other side, the current values for both P1 and P2 polymers were decreased with increasing the scan rates. The ratio of reduction current to oxidation current (Ir/Ia) was plotted over scan rates, as shown in FIG. 6C. P2 showed constant Ir/Ia at low scan rate compared to P1. CV curves revealed the good electrochemical performance of P1 and P2 in terms of Redox behavior. The data analysis using CV curves revealed good capacitance for both polymer P1 and P2 (FIG. 7A). The capacitance values for both polymers versus scan rates were plotted as shown in FIG. 7A. The capacitance for P1 and P2 was calculated at scan rate 1 mV/s. P1 and P2 offer capacitance values of 207.9 F/g and 274.8 F/g, respectively at scan rate 1 mV/s, as shown in FIG. 7A.

Figure 7B:
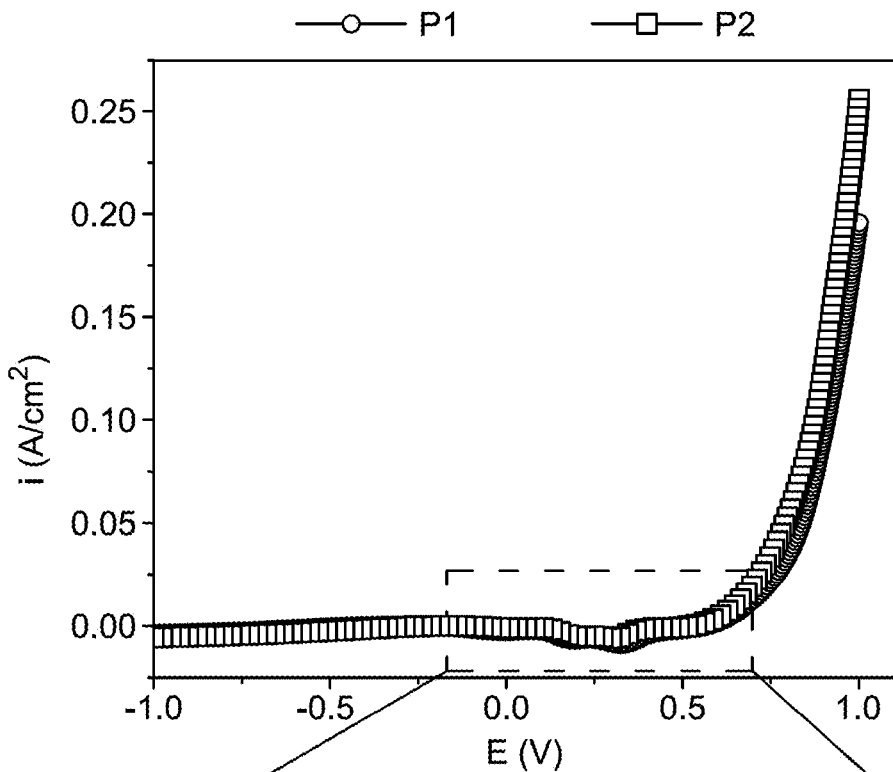
FIG. 7B shows linear sweep voltammetry (LSV) curve for P1 and P2 polymers, according to certain embodiments.
Figure 7C:
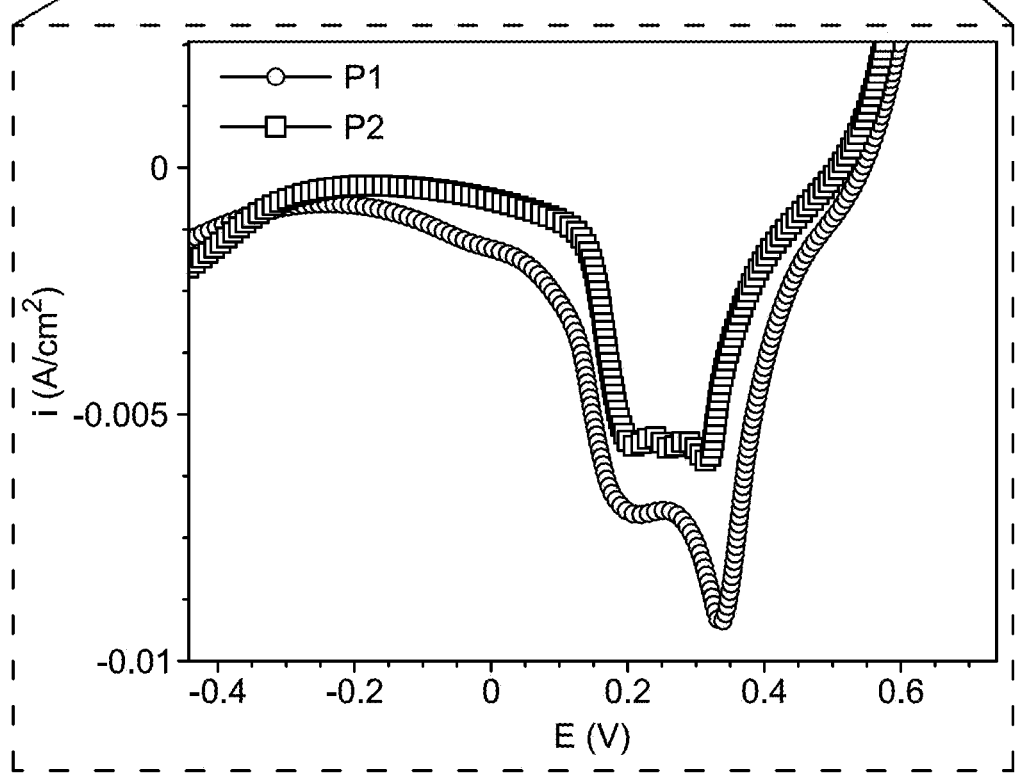
FIG. 7C depicts an enlarged LSV curve for P1 and P2 polymers, according to certain embodiments.

LSV curves for P1 and P2 were described, as shown in FIGS. 7B-7C. Data analysis confirmed the redox properties of the synthesized polymers. The negative current in LSV provided insights into the electrochemical properties of the conjugated polymer, including its redox potential, and electron transfer kinetics, as shown in FIGS. 7B-7C. The electrochemical reduction was typically which may result from redox processes.

Figure 8A:
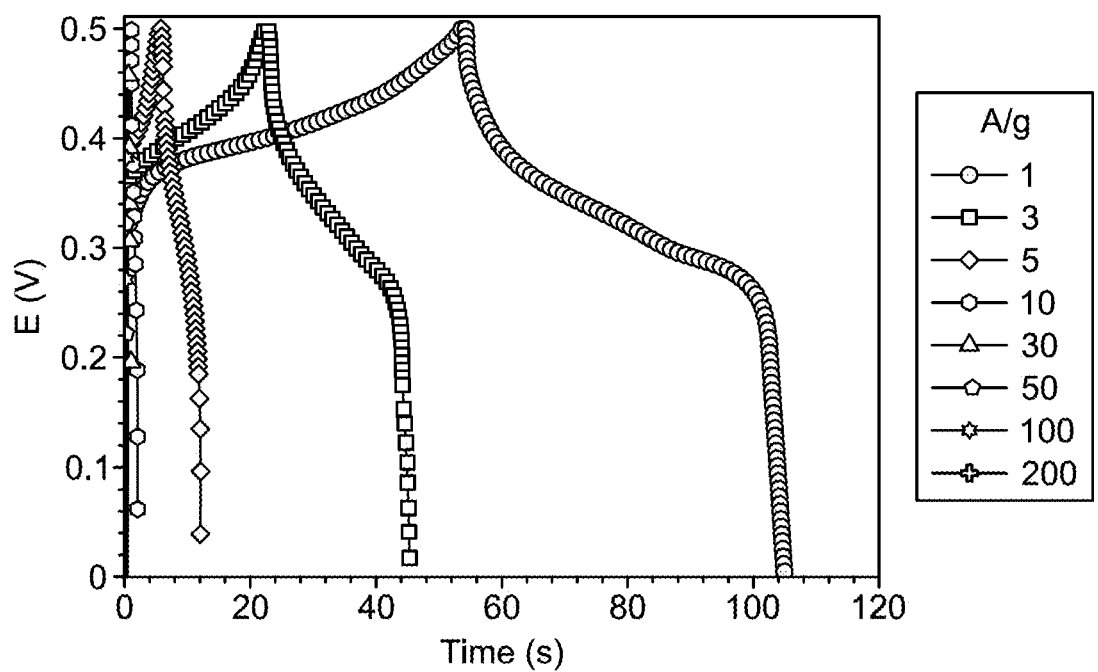
FIG. 8A is a galvanostatic charge-discharge curve (GCDC) for P1 polymer at different current densities, according to certain embodiments.
Figure 8B:
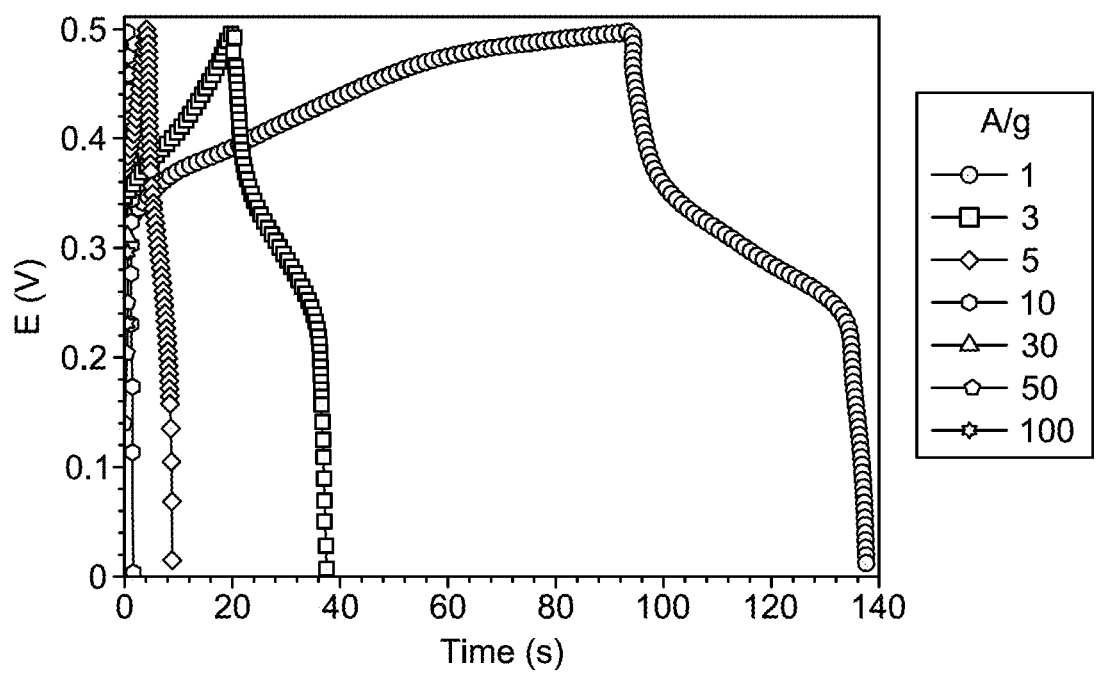
FIG. 8B is a GCDC for P2 polymer at different current densities, according to certain embodiments.

The capacitance of P1 and P2 determined using GCDC, as shown in FIGS. 8A-8B. The data was collected using different current densities in the range of 1-200 A/g. P1 displays 102.6 F/g, 133.2 F/g, 62 F/g, 24 F/g, 12 F/g, 20 F/g, and 20 F/g at a current density of 1, 3, 5, 10, 30, 50, and 100

A/g, as shown in FIG. 8A. On the other side, P2 showed specific capacitance of 88.2 F/g, 102 F/g, 46 F/g, 20 F/g, 12 F/g, 20 F/g, and 20 F/g at a current density of 1 A/g, 3 A/g, 5 A/g, 10 A/g, 30 A/g, 50 A/g, and 100 A/g, as shown in FIG. 8B. The shape of the GCDC may be used to indicate the mechanism for energy storage. Data analysis reveals that electrodes based on P1 and P2 exhibited good capacitance properties with small voltage internal resistance (IR) drops, as shown in FIGS. 8A-8B.

Figure 9A:
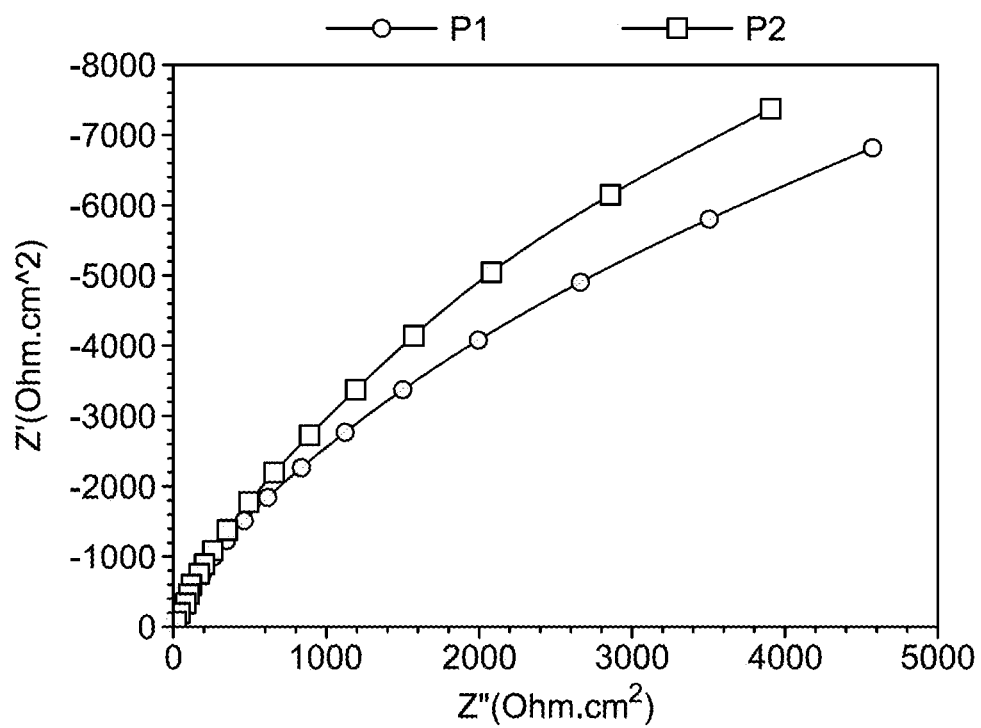
FIG. 9A depicts Nyquist plots for P1 and P2 polymers, according to certain embodiments.
Figure 9B:
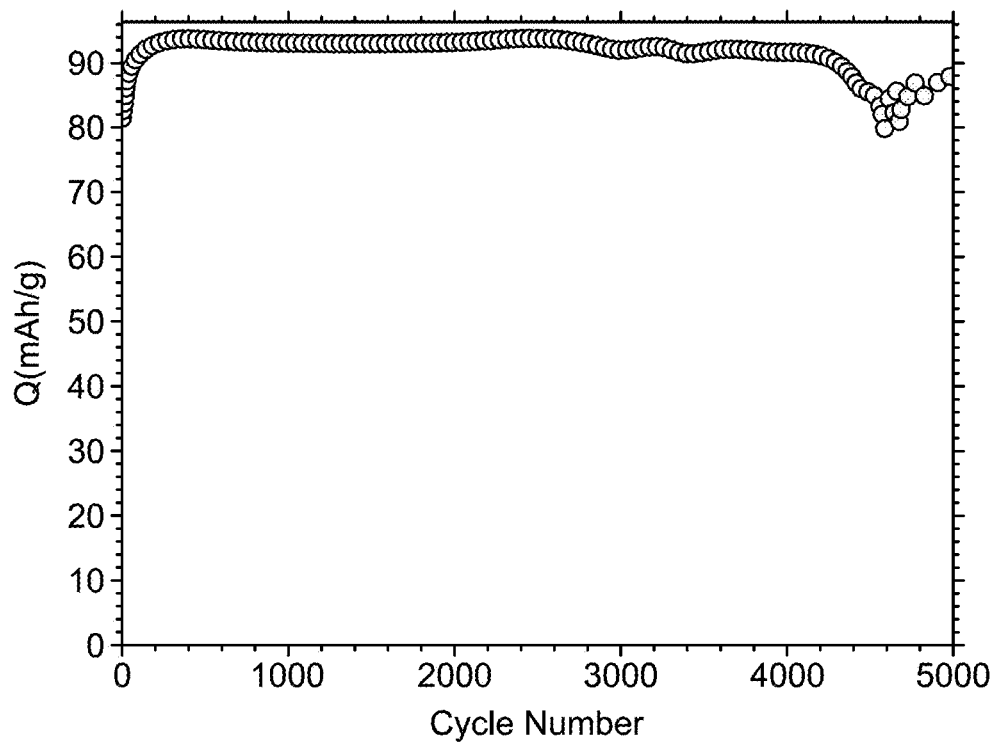
FIG. 9B shows recyclability using P1 polymer, according to certain embodiments.

EIS was analyzed using Nyquist plots for the two polymers, as shown in FIGS. 9A-9B. Nyquist plot was a graphical representation that illustrates the electrical impedance of materials at different frequencies. Both P1 and P2 have a negative slope on the imaginary impedance (Z") axis as the real impedance (Z') rises, as shown in FIGS. 9A-9B. This observation suggests a capacitive response of both polymers. The plots for P1 and P2 exhibited an overlap due to the similar chemical structure. This observation is because of the close chemical structures of both polymers. The Nyquist plots provide insights into further electrochemical processes taking place at the electrodes, including charge transfer resistance, indicating a capacitive response for both P1 and P2. The conjugation of the synthesized polymers reduces the electrode resistance, offering high conductivity for both P1 and P2.

The recyclability of P1 was examined for successive 5000 cycles of charge and discharge, as shown in FIG. 9B. The electrode of P1 materials showed a specific capacitance of 93 milliampere-hours per gram (mAh/g) over 5000 cycles with only less than a 10% drop in the material's performance. This observation indicated that electrodes prepared using for polymers of the present disclosure may be used for recyclable supercapacitors.

The supercapacitor of the present application may be useful for energy storage. This utility may be due to improved performance characteristics. Traditional supercapacitors struggle to balance energy storage and power delivery, but the conjugated polymers (P1 and P2) developed in the present disclosure exhibited relatively high specific capacitances of 274.8 F/g and 207.9 F/g, respectively. This higher energy storage capacity may be useful in addressing the longstanding challenge of low energy density in supercapacitors. This may be a significant improvement compared to many conventional materials, offering better energy storage capabilities. The polymers were found to be stable, maintaining over 90% of efficiency even after 5000 cycles, unlike many conventional materials that degrade faster and demonstrated excellent long-term stability and durability, far better than many existing materials that degrade much faster. The extended cycle life affects the universal issue of rapid efficiency loss in conventional supercapacitor materials.

Additionally, P1 and P2 polymers lead to a significant reduction in charge transfer resistance, improving their overall electrochemical performance. The polymers exhibit reduced internal resistance due to their conjugated structure, leading to faster charge/discharge times and higher power efficiency compared to many traditional materials, which suffer from high charge transfer resistance. Further analysis revealed that the polymers may absorb light effectively and have a relatively low bandgap ranging from 2.3 eV to 2.4 eV, enhancing their electrical conductivity and making them more efficient for energy storage applications. Furthermore, the polymers exhibited wide light absorption in the range of 200 nm to 466 nm, which could potentially make them suitable for hybrid systems that integrate energy storage with solar energy harvesting. With light absorption in the range of 200 nm to 466 nm, these polymers may potentially be integrated into hybrid systems that combine energy storage and energy harvesting, such as solar-powered supercapacitors.

These properties may be useful for improving the efficiency, stability, and performance of supercapacitors. These improvements may be realized by introducing conjugated polymer materials that offer high capacitance, low charge transfer resistance, excellent recyclability, and efficient light absorption. The electrochemical behavior of the polymers, demonstrated through CV, showed a reversible oxidation-reduction mechanism, providing high charge storage efficiency. Ultimately, the present disclosure lies in the synthesis and design of conjugated polymers that offer high specific capacitance, excellent cycling stability, improved charge transfer properties, and wide light absorption capabilities, making them ideal for hybrid energy systems.

Further, the obtained polymers retain >90% of their initial capacitance after 5000 cycles. This high durability, combined with the low degradation rate, suggests that these polymers have the potential for long-term use in practical supercapacitor applications, outperforming many existing organic and inorganic materials. The synthesized polymers in the present disclosure offer significant advancements in supercapacitor-based technologies, making them highly suitable for a range of commercial applications and potential products. In the field of consumer electronics, the higher capacitance, fast charge/discharge rates, and excellent cycle stability make these conjugated polymers ideal for powering small electronic devices such as portable electronics, wearable devices, and smartphones. Their compact energy storage and long-lasting performance make them an attractive alternative to conventional batteries. For electric vehicles (EVs) and hybrid systems, the supercapacitors are increasingly being used in electric vehicles for quick energy bursts during acceleration or braking. The polymers' high energy density and excellent cycle life may be applied to enhance energy recovery systems in EVs, especially for rapid charge/discharge cycles. The solar-powered supercapacitor systems include the wide light absorption range of 200 nm to 466 nm opens up possibilities for integrating these polymers into hybrid solar-energy storage systems. By combining energy harvesting and storage in a single device, this technology could be used for off-grid power supplies, smart grid applications, or solar-powered sensors. Grid-scale energy storage, with their high capacitance, long cycle life, and scalability, these polymers may potentially be used in large-scale grid storage systems, helping to balance power supply and demand by providing fast power during peak periods. Further, wearable energy storage due to their high energy density and flexibility, these polymers may be integrated into wearable flexible electronics and smart textiles, powering applications like health-monitoring devices, smart fabrics, or even augmented reality (AR) wearables.

Prototype supercapacitors have been fabricated using the synthesized P1 and P2 conjugated polymers. These prototypes showed promising electrochemical performance, as evidenced by the experimental data presented. Materials used in these prototypes include TPE-based monomers, 1,5-DAN, and tetra-carboxaldehyde, with no requirement for specialized or rare raw materials. This makes the materials relatively cost-effective for scaling up production.

The experimental data confirms that the polymers, which demonstrated high specific capacitance up to 274.8 F/g, maintain excellent cycling stability less than <10% loss over 5000 cycles, show low charge transfer resistance, enabling faster charge/discharge times and have wide light absorption ranging between 200 nm to 466 nm, opening applications in hybrid solar-storage systems.

The present disclosure provides a type of conjugated polymers that significantly enhance the performance of supercapacitors in terms of energy storage, cycle stability, and efficiency. The technology was demonstrated experimentally with promising findings that indicate its commercial potential in energy storage for electronics, electric vehicles, and renewable energy systems. The materials developed are scalable and cost-effective, offering broad opportunities for industrial applications.

Numerous modifications and variations of the present disclosure are possible in light of the above teachings. Therefore, it is to be understood that within the scope of the appended claims, the invention may be practiced other than as specifically described herein.

The invention claimed is:

1. A supercapacitor, comprising
a pair of electrodes including a first electrode and a second electrode separated by an electrolyte comprising a polymer having repeating units having a structure which is at least one selected from the group consisting of formula (1) and formula (2):

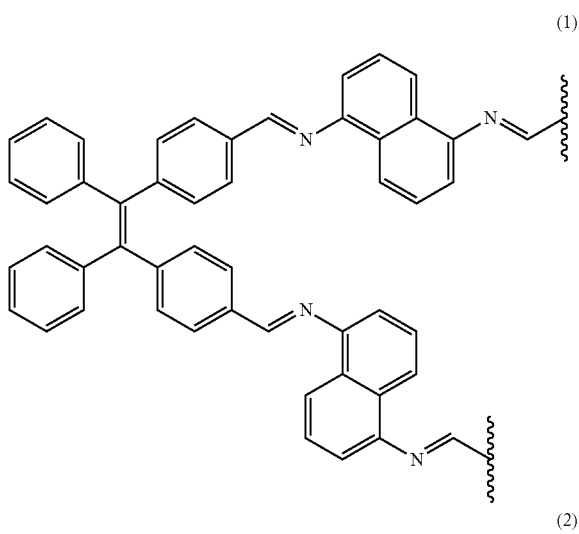

(1)

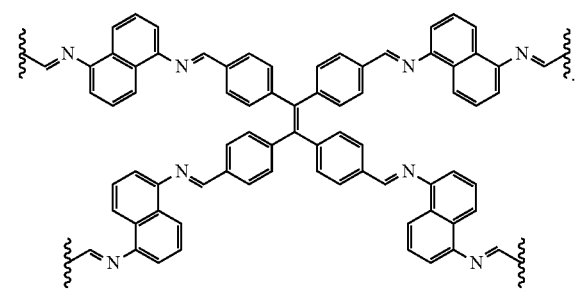

(2)

2. The supercapacitor of claim 1, wherein the polymer has a band gap of 1.9 to 2.9 eV.

3. The supercapacitor of claim 1, wherein the polymer has a capacitance of 175 to 300 F/g.

4. The supercapacitor of claim 1, wherein the polymer is in the form of spherical particles having a mean particle size of 0.1 to 15 μm.

5. The supercapacitor of claim 1, wherein the polymer has repeating units having a structure of formula (1) and is substantially free of repeating units having a structure of formula (2).

6. The supercapacitor of claim 1, wherein the polymer has repeating units having a structure of formula (2) and is substantially free of repeating units having a structure of formula (1).

7. The supercapacitor of claim 1, wherein the polymer has 500 to 500,000 repeating units having a structure which is at least one selected from the group consisting of formula (1) and formula (2).

8. The supercapacitor of claim 1, wherein the polymer consists of repeating units having a structure which is at least one selected from the group consisting of formula (1) and formula (2).

9. The supercapacitor of claim 1, wherein the first electrode and the second electrode are each formed of nickel foam.

10. The supercapacitor of claim 1, wherein the electrolyte further comprises carbon black.

11. The supercapacitor of claim 1, wherein the electrolyte further comprises polyvinylidene difluoride.

12. The supercapacitor of claim 1, wherein the electrolyte comprises
60 to 80 wt. % the polymer;
15 to 25 wt. % carbon black; and
5 to 15 wt. % polyvinylidene difluoride, each based on a total weight of electrolyte.

13. The supercapacitor of claim 1, wherein the supercapacitor has a specific capacity of 75 to 125 mAh/g.

14. The supercapacitor of claim 1, which retains at least 90% of an initial capacitance after 5000 charge-discharge cycles.

15. A method of forming the supercapacitor of claim 1, wherein the polymer has repeating units having a structure of formula (1) and is substantially free of repeating units having a structure of formula (2), the method comprising
reacting a dialdehyde of formula (3) with 1,5-diaminonaphthalene in a mixture comprising an alcohol having 1 to 5 carbon atoms, a halogenated organic solvent, and an organic acid having 1 to 5 carbon atoms to produce the polymer having repeating units having a structure of formula (1),

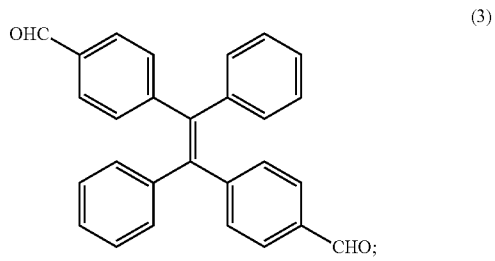

(3)

dispersing the polymer in a deposition solvent to form an electrolyte deposition slurry;

disposing the electrolyte comprising the polymer on the first electrode such that the electrolyte forms a uniform film covering an entirety of a top surface of the first electrode; and placing onto the electrolyte the second electrode such that the second electrode is separated from the first electrode by the electrolyte to form the supercapacitor.

16. The method of claim 15, wherein the alcohol having 1 to 5 carbon atoms is n-butanol;

the halogenated organic solvent is 1,2-dichlorobenzene;

the organic acid having 1 to 5 carbon atoms is acetic acid; and the electrolyte deposition solvent is N-methyl pyrrolidone.

17. The method of claim 15, wherein the reacting is performed at 100° C. to 150° C.

18. A method of forming the polymer of claim 1, wherein the polymer has repeating units having a structure of formula (2) and is substantially free of repeating units having a structure of formula (1), the method comprising reacting a tetraaldehyde of formula (4) with 1,5-diaminonaphthalene in a mixture comprising an alcohol having 1 to 5 carbon atoms, a halogenated organic solvent, and an organic acid having 1 to 5 carbon atoms to produce the polymer having repeating units having a structure of formula (2),

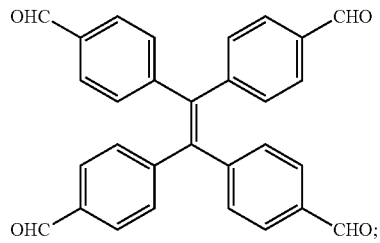
(4)

dispersing the polymer in a deposition solvent to form an electrolyte deposition slurry;

disposing the electrolyte comprising the polymer on the first electrode such that the electrolyte forms a uniform film covering an entirety of a top surface of the first electrode; and placing onto the electrolyte the second electrode such that the second electrode is separated from the first electrode by the electrolyte to form the supercapacitor.

19. The method of claim 18, wherein the alcohol having 1 to 5 carbon atoms is n-butanol;

the halogenated organic solvent is 1,2-dichlorobenzene;

the organic acid having 1 to 5 carbon atoms is acetic acid; and the electrolyte deposition solvent is N-methyl pyrrolidone.

20. The method of claim 18, wherein the reacting is performed at 100° C. to 150° C.

* * * * *